US012772087B2

(12) United States Patent
Uchino et al.

(10) Patent No.: US 12,772,087 B2
(45) Date of Patent: Oct. 20, 2026

(54) RADIO LINK MANAGEMENT IN DUAL CONNECTIVITY SCENARIOS

(71) Applicant: Qualcomm Incorporated, San Diego, CA (US)

(72) Inventors: Toru Uchino, Zushi (JP); Bharat Shrestha, San Diego, CA (US); Umesh Phuyal, San Diego, CA (US); Masato Kitazoe, Hachiouji (JP); Xiao Feng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 18/208,240

(22) Filed: Jun. 9, 2023

(65) Prior Publication Data

US 2024/0414576 A1 Dec. 12, 2024

(51) Int. Cl.

*H04W 24/10* (2009.01)
*H04B 7/185* (2006.01)
*H04W 76/19* (2018.01)

(52) U.S. Cl.

CPC ........ *H04W 24/10* (2013.01); *H04B 7/18519* (2013.01); *H04W 76/19* (2018.02)

(58) Field of Classification Search

CPC . H04W 24/10; H04W 76/19; H04W 56/0045; H04B 7/18519; H04B 7/18541; H04B 7/18543

See application file for complete search history.

(56) References Cited

U.S. PATENT DOCUMENTS

2021/0282211 A1* 9/2021 Pezeshki ............... H04W 76/19
2023/0371107 A1* 11/2023 Wu ....................... H04W 76/19
2024/0422643 A1* 12/2024 Balan ................ H04W 36/0069
2025/0047373 A1* 2/2025 Li ...................... H04W 36/0072
2025/0184854 A1* 6/2025 Persson ............... H04W 36/362
2025/0203482 A1* 6/2025 Dange ............... H04W 36/0058

OTHER PUBLICATIONS

3GPP TR 38.821: "3rd Generation Partnership Project; Technical Specification Group Radio Access Network; Solutions for NR to support non-terrestrial Networks (NTN) (Release 16)", 3GPP TR 38.821 V16.2.0, Mar. 2023, pp. 1-140.

3GPP TS 37.340: "3rd Generation Partnership Project; Technical Specification Group Radio Access Network; Evolved Universal Terrestrial Radio Access (E-UTRA) and NR; Multi-Connectivity; Stage 2 (Release 17)", TS 37.340 V17.4.0, Mar. 2023, pp. 1-120.

(Continued)

*Primary Examiner* — Gary Mui
*Assistant Examiner* — Yewon Kim
(74) *Attorney, Agent, or Firm* — Dinsmore & Shohl LLP

(57) ABSTRACT

Certain aspects of the present disclosure provide techniques for radio link monitoring, failure detection, and recovery in terrestrial network (TN)-non-terrestrial network (NTN) architectures. A method includes determining one or more conditions of a user equipment (UE) and based on the one or more conditions of the UE, adjusting a timing for performing one or more steps of a radio link monitoring, failure detection, or recovery process for a radio link of one or more cells.

30 Claims, 17 Drawing Sheets

(56) References Cited

OTHER PUBLICATIONS

3GPP TS 38.331: "3rd Generation Partnership Project; Technical Specification Group Radio Access Network; NR, Radio Resource Control (RRC) protocol specification (Release 17)", 3GPP TS 38.331, V17.4.0, Mar. 2023, pp. 1-1321.

International Search Report and Written Opinion issued in PCT/US2024/032855, mailed Oct. 9, 2024, EPO, 15 pages.

Majamaa M., et al., "Multi-Connectivity in 5G and Beyond Non-Terrestrial Networks," Journal of Communications Software and Systems, vol. 18, No. 4, Dec. 4, 2022, pp. 350-358.

Wang F., et al., "Seamless Handover in LEO Based Non-Terrestrial Networks: Service Continuity and Optimization," IEEE Transactions on Communications, vol. 71, No. 2, Feb. 2023, pp. 1008-1023.

* cited by examiner

RADIO LINK MANAGEMENT IN DUAL CONNECTIVITY SCENARIOS

BACKGROUND

Field of the Disclosure

Aspects of the present disclosure relate to wireless communications, and more particularly, to techniques for radio link monitoring, failure detection, and recovery in terrestrial network (TN)-non-terrestrial network (NTN) dual connectivity (DC) scenarios.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment. The method includes determining one or more conditions of the user equipment; and based on the one or more conditions of the user equipment, adjusting a timing for performing one or more steps of a radio link monitoring, failure detection, or recovery process for a radio link of one or more cells.

Another aspect provides a method for wireless communications at a first network entity. The method includes determining one or more conditions of a user equipment; receiving an indication of a radio link failure (RLF) for a radio link of a cell group associated with the first network entity or a second network entity from the user equipment; and transmitting, to the user equipment, an indication to adjust a timing for performing one or more steps of a radio link monitoring, failure detection, or recovery process for the radio link based on the one or more conditions of the user equipment.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
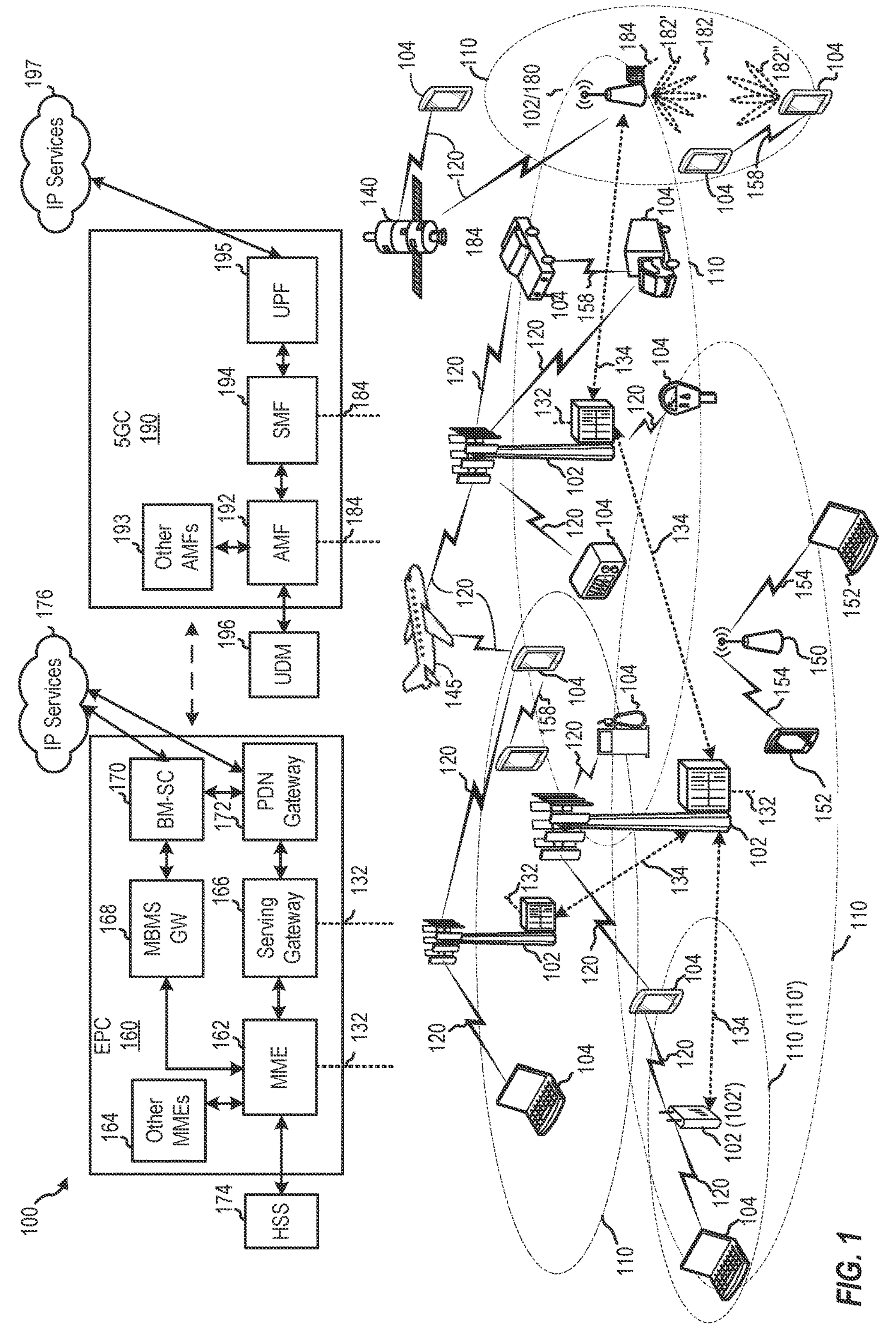
FIG. 1 depicts an example wireless communications network.

Aspects of the present disclosure relate to radio link monitoring, failure detection, and recovery (e.g., radio link management procedures) in terrestrial network (TN)-non-terrestrial network (NTN) architecture.

TNs generally provide wireless data and communication to devices (e.g., user equipments (UEs)) via land-based network entities (e.g., base stations (BSs)). Many considerations dictate the placement of land-based network entities and, as such, TNs generally have limited, population-centric coverage. On the other hand, NTNs generally provide wireless data and communication services from non-land-based platforms, such as satellites, aircrafts, drones, balloons, and the like. Owing to their altitude and/or mobility, NTNs may often be able to provide wireless data and communication services to areas where TN-based service is not available. NTNs may be implemented as extensions to, or otherwise aspects of, an existing wireless communication network, such as a TN. In this way, NTNs may greatly increase the coverage of such TNs.

Some networks may implement dual-connectivity (DC) architectures in which connecting devices may connect to TN-based and NTN-based network entities for data and communication services. For example, a user equipment (UE) may be configured to connect simultaneously to an NTN entity, e.g., a master node, and a TN entity, e.g., a secondary node, using multi-radio (MR) DC. The UE may further be configured to operate in carrier aggregation (CA) mode with each node, in which the UE aggregates bandwidth across the connections to improve data and communication services. In some cases, the TN entity is configured to handle user plane signaling from the UE and offload control plane signaling to the NTN entity. In such cases, radio resources at the TN entity and the NTN entity are utilized for different signaling types.

The NTN entity and the TN entity are the master node and secondary node, respectively, of the UE. In case of MR DC, a master node provides a control plane connection to a core network (CN). Further, both the master node and the secondary node provide radio resources to the UE. A group of serving cells associated with the master node is referred to as a master cell group (MCG), while a group of serving cells associated with a secondary node is referred to as a secondary cell group (SCG).

In some cases, the UE may move out-of-coverage (OOC) of a serving cell (e.g., an NTN cell) of the MCG. When OOC of the serving cell, the UE is unable to receive signal(s) from the NTN entity. The UE may detect a radio link failure (RLF) based on an inability to communicate with the NTN entity and trigger radio link management procedures to restore connectivity (also referred to as the "Fast MCG link recovery process" in the 3GPP specification).

In some aspects, the radio link management procedures involve: (1) monitoring the radio link, (2) detecting a failure of the radio link, (3) starting at timer used to initiate a radio resource control (RRC) re-establishment procedure, (4) transmitting a failure message to the node associated with the failed radio link, and (5) performing a handover or the RRC re-establishment procedure to re-establish the connection. In conventional implementations (e.g., standards-based implementations such as 3GPP), performance of each of these steps is performed immediately after a previous step has completed, or otherwise based on a fixed timing offset (e.g., defined in a specification). For example, the 3GPP specification (e.g., 3GPP Technical Specification (TS) 38.331 Section 7.1) indicates a static value for the timer used to initiate performance of the RRC re-establishment procedure, which is defined irrespective of conditions present in different RLF scenarios where the timer is used.

The static timing for performing each of the steps of the radio link management procedures in conventional implementations presents a technical problem in that the static timings cannot take advantage of dynamic information regarding the radio link. For example, in some cases, a static (e.g., specification-defined) timer value may be too long, or in other words, provide too much time prior to triggering an RRC re-establishment procedure (e.g., cases where an NTN entity is unequivocally unable to communicate with the UE). As such, the period of service interruption between the UE and the NTN entity may be prolonged due to the UE waiting for the static timing to trigger the RRC re-establishment procedure to release and re-establish an RRC connection with a network. As another example, in some cases, the static (e.g., specification-defined) timer may be too short. For example, the static timing may not give an NTN entity enough time to instruct the UE to perform a handover to a target cell of the MCG that provides better coverage to the UE. As such, an RRC re-establishment procedure may be triggered before the NTN entity is able to instruct the UE to perform the handover. Performing the RRC re-establishment procedure, as opposed to the handover, may increase the interruption period for service to the UE compared to what the interruption period would have been if the handover would have been performed.

Certain aspects provide a technical solution to the aforementioned technical problems by enabling the UE to dynamically adjust a timing for performing one or more steps of the radio link management procedures. For example, in some cases, the UE adjusts the timing for performing step(s) of the procedure based on conditions of the UE (e.g., a location of the UE, a velocity of the UE, etc.). In some cases, the UE adjusts the timing for performing step(s) of the procedure based on instructions to adjust the timing, received from a master node (e.g., an NTN entity) or a secondary node (e.g., a TN entity) that the UE is communicating with via MR-DC.

Adjusting the timing for performing a step of the radio link management procedure may involve lengthening (or delaying) the timing for performing the step (e.g., based on a timing currently specified in a specification), shortening (or advancing) the timing for performing the step (e.g., based on a timing currently specified in a specification), canceling or terminating performance of the step, disabling performance of the step, or suspending performance of the step. As used herein, disabling the performance of a step may apply to steps for which the UE has already begun performance, while suspending performance of a step may apply to steps for which the UE has not already begun performance. Adjusting the timing for performing a particular step of the process may or may not affect the timing for performing one or more other steps of the procedure.

Because timing for performing each of the steps of the radio link management procedure is dynamically determined, a most appropriate timing for performing each of the steps may be selected, given the circumstances, such that the least amount of interruption time is experienced in each radio link management scenario. Reducing interruption time may improve overall user experience, as well as avoid wasting resources to perform resource-intensive procedures (e.g., RRC re-establishment procedures) where such procedures are not necessary to re-establish a connection with a network.

Introduction to Wireless Communications Networks

The techniques and methods described herein may be used for various wireless communications networks. While aspects may be described herein using terminology commonly associated with different generation wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network entities). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
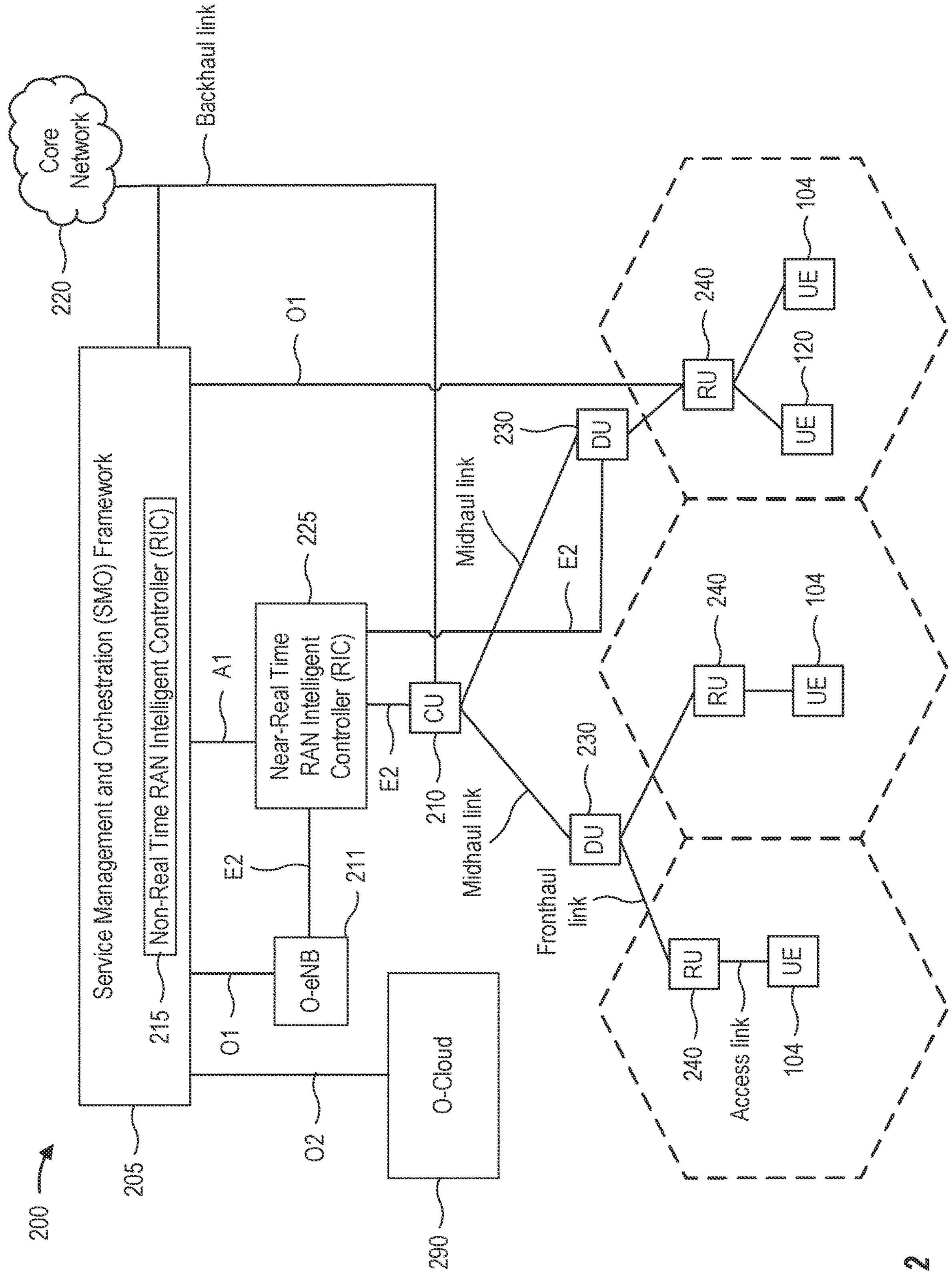
FIG. 2 depicts an example disaggregated base station (BS) architecture.

While BSs 102 are depicted in various aspects as unitary communications devices, BSs 102 may be implemented in various configurations. For example, one or more components of a BS may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a BS may be virtualized. More generally, a BS (e.g., BS 102) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as a disaggregated radio access network architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410

MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182''. UE 104 may also transmit a beamformed signal to the BS 180 in one or more transmit directions 182''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
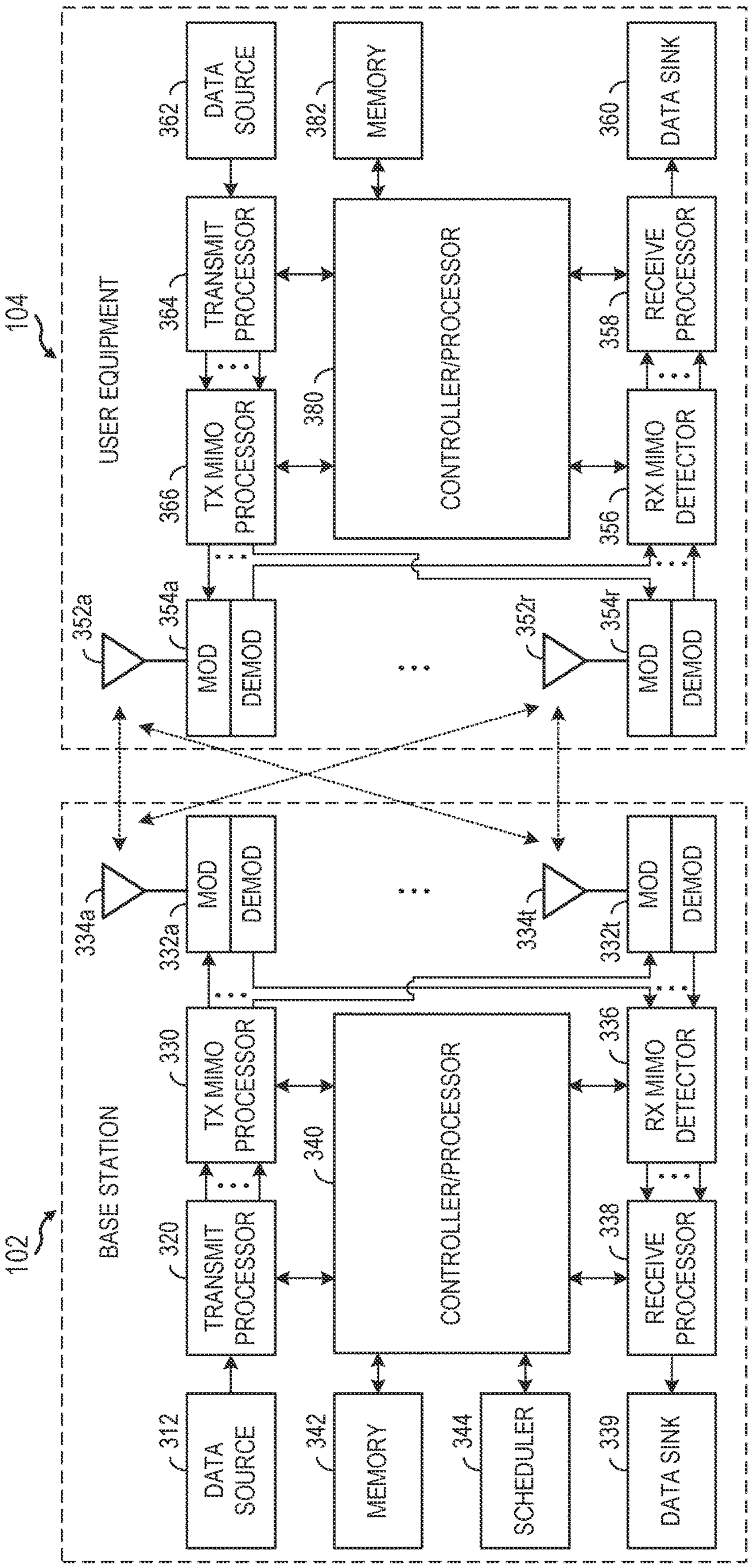
FIG. 3 depicts aspects of an example network entity, such as an example BS, and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
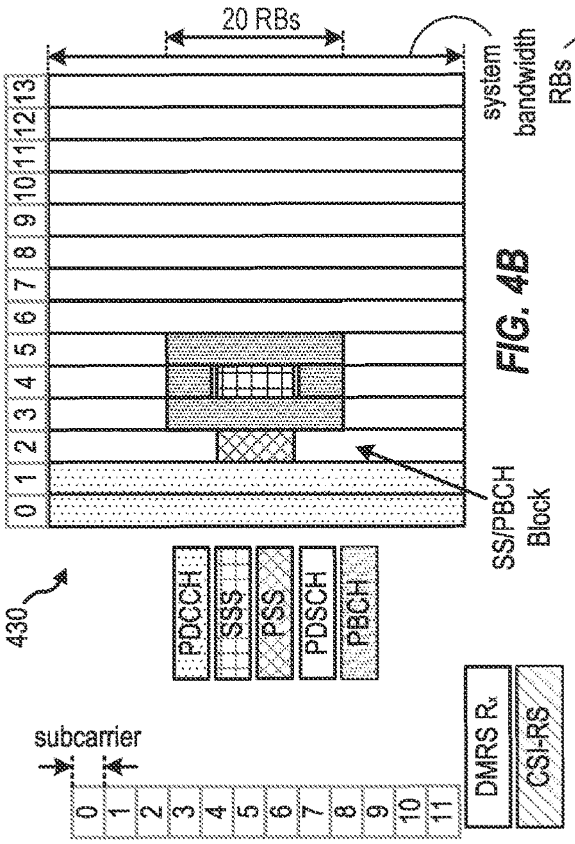
FIGS. 4A, 4B, 4C, and 4D depict various example aspects of data structures for a wireless communications network.
Figure 4D:
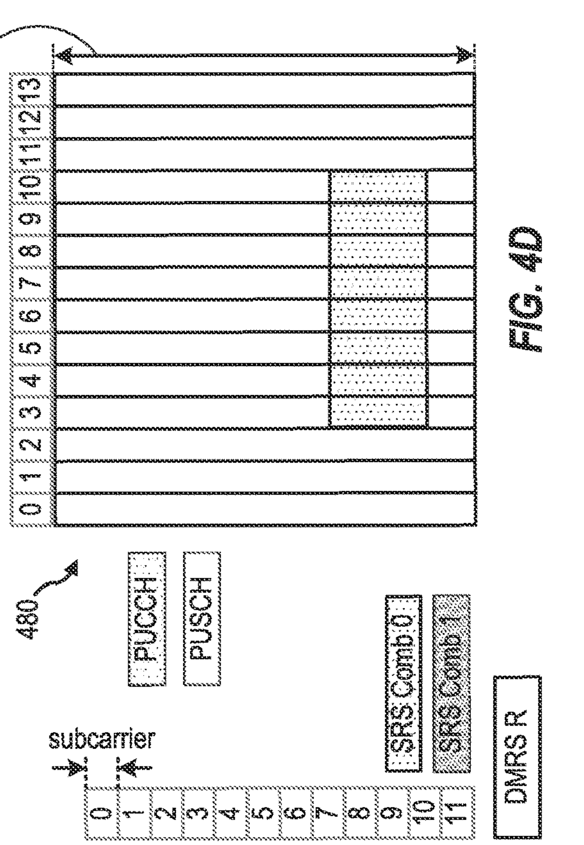
Figure 4A:
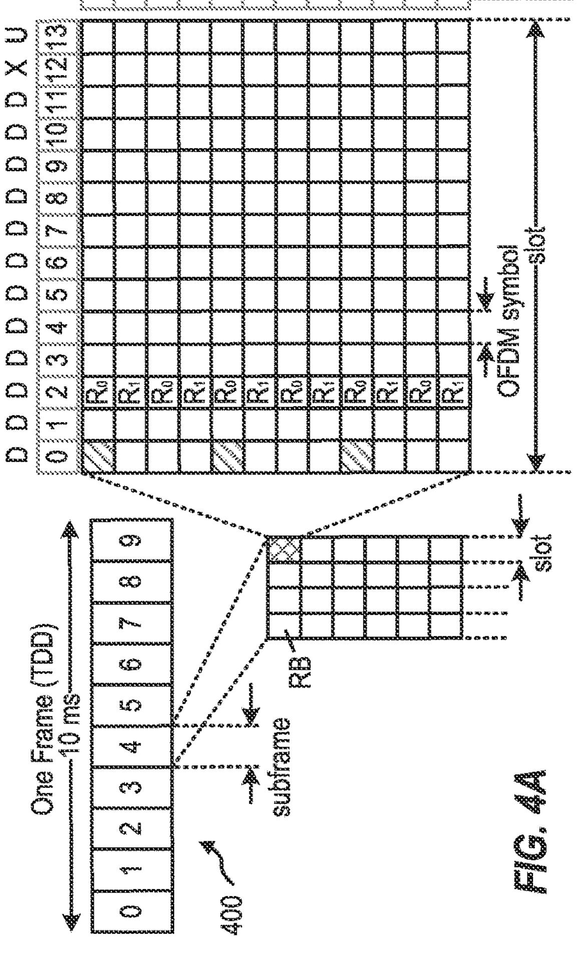
Figure 4C:
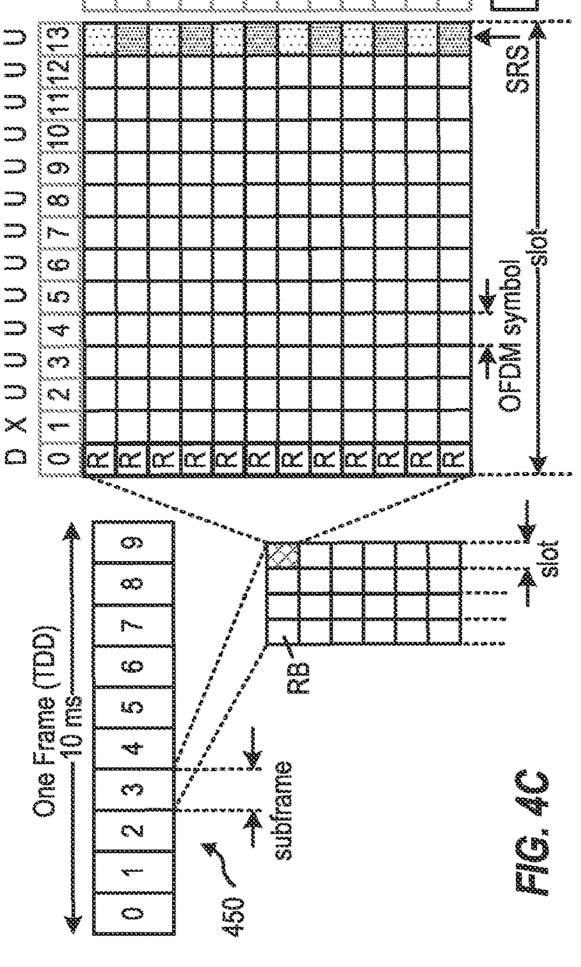

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Terrestrial Network and Non-Terrestrial Network Integration

Terrestrial network (TN) coverage is often limited in places where network infrastructure is sparse and/or has not been established, such as in rural and remote areas, deserts, oceans, and the like. Non-terrestrial networks (NTNs) may thus compliment TNs with additional coverage for areas with little or no TN coverage.

NTNs may include a wide variety of network entity platforms, including satellite vehicles (SVs), high altitude platform systems (HAPS), air-to-ground (A2G) systems, and the like. For example, NTN entities, such as satellites, drones, and other airborne vehicles, may implement base station functions and to provide connectivity wirelessly to even the most remote areas on Earth as well as to other vehicles in space. Beneficially, NTN coverage is revolutionizing many industries by providing reliable, high-speed, connectivity to previously uncovered areas.

In some cases, TNs and NTNs work together in a heterogeneous environment to extend coverage and/or offload TN data traffic. For example, TN and NTN-based carriers may be aggregated via carrier aggregation, multi-connectivity, or dual connectivity (DC) techniques to improve data and communication services (e.g., in terms of data rate and/or reliability). Generally, multi-connectivity and DC refer to leveraging heterogeneous architectures in a network. Multi-connectivity enables a UE (e.g., such as UE 104 in FIGS. 1-3) to simultaneously use carriers from different (and heterogeneous) network entities, such as BSs, Wi-Fi access points (APs), etc. DC is a subset of multi-connectivity that enables a UE to simultaneously use two carriers from different (and heterogeneous connectivity) network entities, such as BSs, Wi-Fi access points (APs), etc. For example, where carriers of a TN and an NTN are aggregated, a UE may be connected and served simultaneously by at least one NTN-based node (e.g., a NTN entity, NTN gNB, or NTN NG-eNB) and one TN-based node (e.g., TN gNB or NG-eNB).

Figure 5:
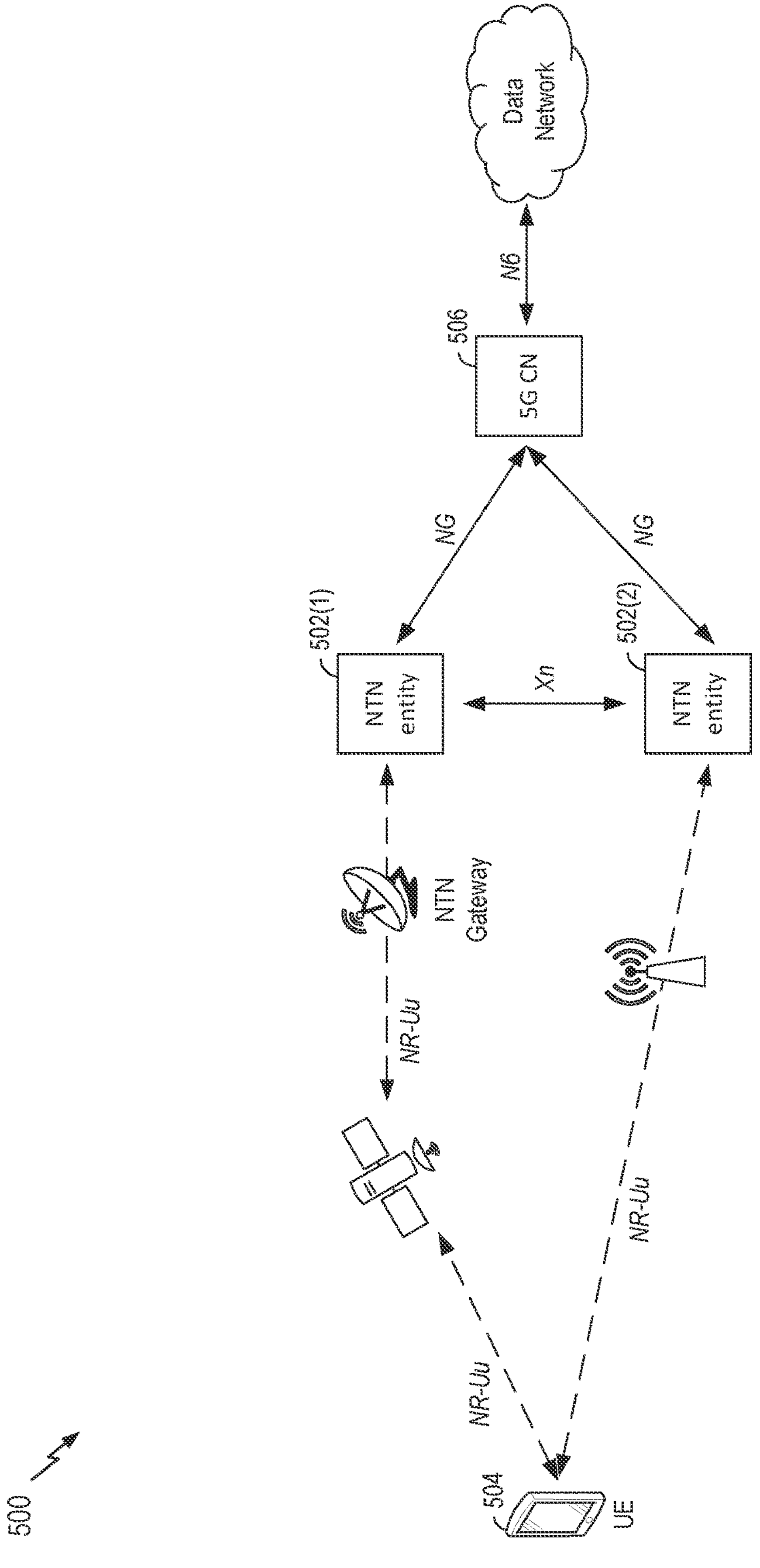
FIG. 5 depicts example dual-connectivity (DC) architecture involving a non-terrestrial network-based radio access network and cellular radio access network.

FIG. 5 depicts an example DC architecture 500 involving an NTN-based RAN and a cellular RAN. As illustrated, a UE 104 is connected to a 5G core network (CN) 506 via simultaneously a network entity of the NTN-based RAN (e.g., NTN entity 502(1)) and a network entity of a the cellular RAN (e.g., TN entity 502(2)). NR-Uu interfaces connect UE 104 to NTN entity 502(1) and TN entity 502(2). Further, NTN entity 502(1) and TN entity 502(2) are connected via an Xn interface.

As mentioned above, TN-NTN DC architecture 500 may allow for signaling offloading, such as control plane signaling offloading between TN entity 502(2) and NTN entity 502(1). For example, telecommunications networks generally carry three distinct types of data traffic, which may be referred to as distinct types of "planes." In one example, a control plane carries signaling traffic, a user plane carries user, and a management plane carries administrative traffic.

In one example, DC architecture 500 may be configured to offload control plane signaling from the TN to the NTN. In such a case, NTN entity 502(1) acts as a master node that provides radio resources to UE 504 and a control plane connection to 5G CN 506, while TN entity 502(2) acts as a secondary node that provides additional radio resources to UE 504. Radio resources of NTN entity 502(1) may be used to handle the exchange of control plane signaling messages, while radio resource of TN entity 502(2) may be used to handle user plane traffic. Separation of control plane and user plane signaling may improve handover procedures, specifically in areas where many TN cells are deployed (e.g., such as in urban areas) and a large amount of control plane overhead is encountered (e.g., due to constantly handing off between cells).

Figure 6A:
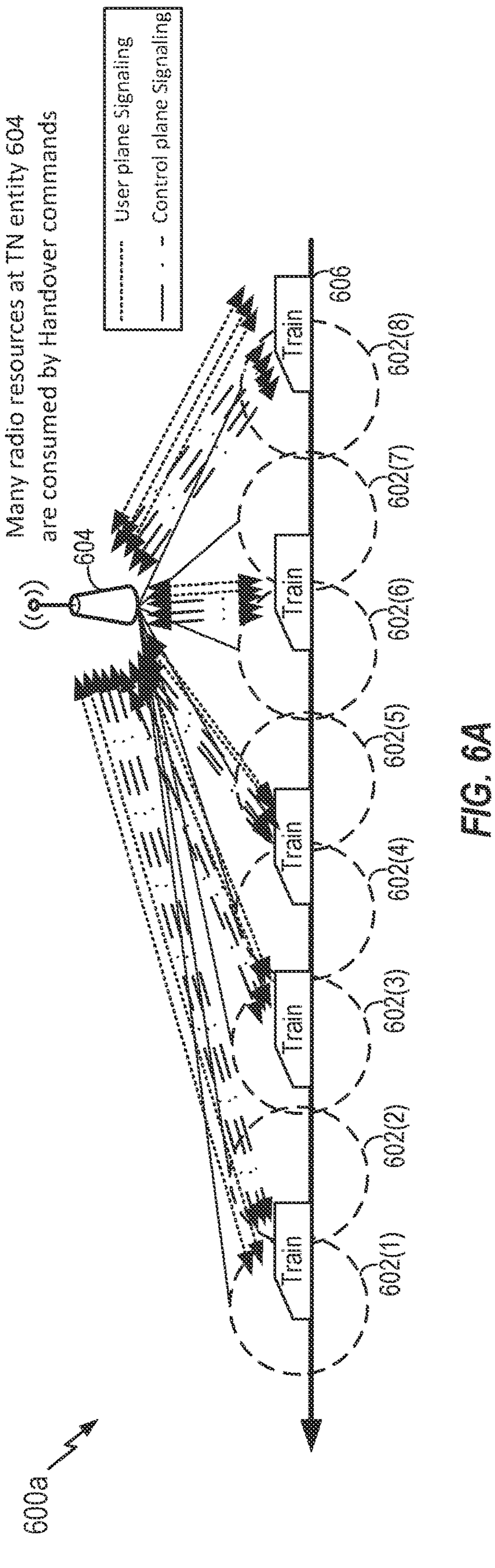
FIGS. 6A and 6B illustrate example handover procedures in areas with large numbers of TN cells with and without TN-NTN DC architecture.
Figure 6B:
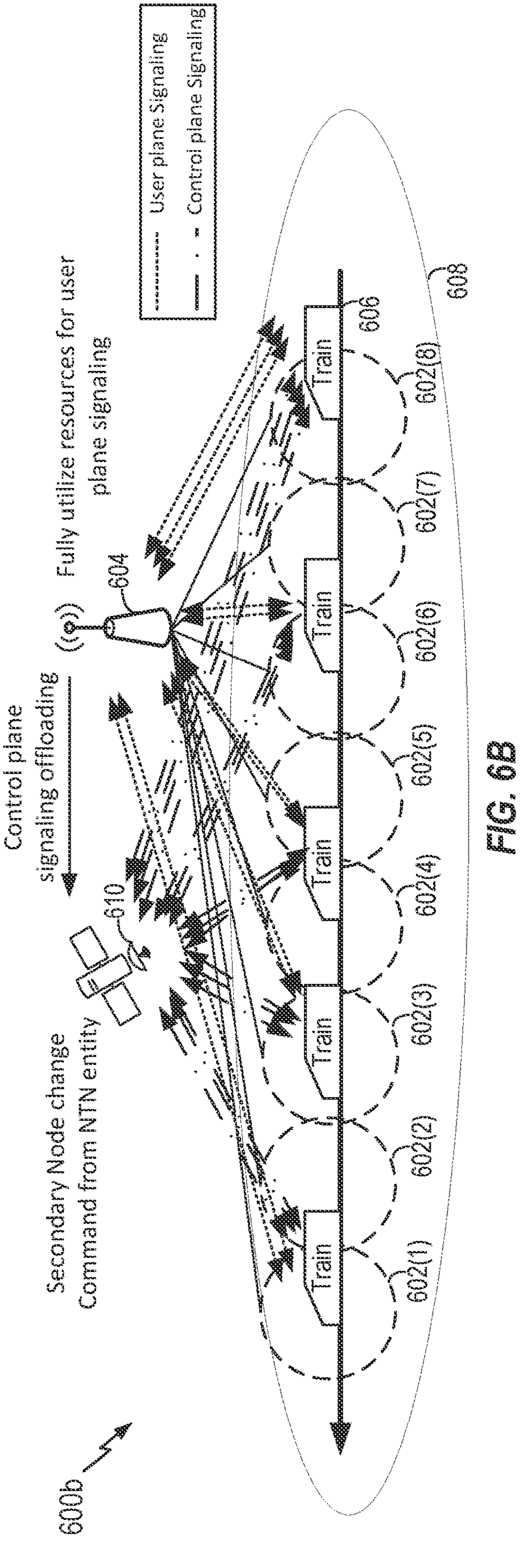

For example, FIGS. 6A and 6B illustrate example handover procedures 600*a*, 600*b* in urban areas without and with TN-NTN DC architecture, respectively. As shown in FIGS. 6A and 6B, many TN cells 602(1)-602(8) (individually referred to herein as "TN cell 602" and collectively referred to as "TN cells 602") are deployed in an urban area. This congested cell deployment leads to frequent handover between TN cells 602. Handover refers to the process of transferring an ongoing call or data connectivity from one network entity associated with a serving cell to another network entity associated with a target cell.

In particular, a UE (e.g., UE 504 in FIG. 5) may communicate with a serving cell for a call. The UE may be mobile and moving from the coverage area of the serving cell into the coverage area of a new cell, which may be able to better serve the UE (e.g., a target cell). As such, the UE may perform handover from the serving cell to the target cell. Performance of the handover procedure to the target cell involves the exchange of multiple control signal messages. Congested cell deployments result in a large number of such handover procedures where UEs are mobile. As such, a large number of radio resources may be consumed for control plane signaling (e.g., to complete the handover procedures between cells). This may be even further increased in scenarios where a UE is moving at high speed (e.g., on a train or airplane) and quickly switching from one cell's coverage to the next.

For example, in FIG. 6A, a UE, positioned on a train 606, is traveling at high speed through an urban area with a congested cell deployment. The UE is connected to TN entity 604 (e.g., similar to TN entity 502(2) in FIG. 5). Multiple TN cells 602 associated with TN entity 604 overlap in the urban area.

As illustrated, the high-speed motion of train 606 causes the UE situated therein to travel through the coverage area of multiple TN cells 602. Handover is performed each time the UE enters a new TN cell 602 having better coverage than a previous TN cell 602. For example, the UE performs a first handover from TN cell 602(8) to TN cell 602(7), a second handover from TN cell 602(7) to TN cell 602(6), a third handover from TN cell 602(6) to TN cell 602(5), and so forth, as train 606 moves through the congested cell area. Each handover procedure involves transmitting control plane signaling to TN entity 604, which is configured to handle both control plane signaling and user plane signaling from the UE.

Because train 606 is traveling at a high speed, the frequency of such handover procedures is increased, thus, leading to high utilization of radio resources at TN entity 604 for managing handovers (e.g., control plane signaling). For example, radio resource control (RRC) signaling is used to transmit handover commands, and RRC signaling may be considered higher-priority signaling than user plane signaling in some cases. Thus, radio resources may be consumed preferentially on RRC signaling related to handovers prior to handling any user plane signaling, which in-turn can delay user plane data getting to UEs. In some cases, available radio resources of TN entity 604 are exhausted before user plane signaling can be handled, which leads to service interruption at the UE—a technical problem with conventional configurations.

To solve this technical problem and to provide a beneficial technical effect thereby, a DC architecture (e.g., such as TN-NTN DC architecture 500 in FIG. 5) may be used to offload control plane signaling at TN entity 604 to an NTN entity 610. For example, as illustrated in FIG. 6B, instead of only being connected to TN entity 604 as illustrated in FIG. 6A, the UE is connected to both TN entity 604 and NTN entity 610 (e.g., similar to NTN entity 502(1) in FIG. 5). TN entity 604 is thus configured to handle user plane signaling from the UE and offload control plane signaling to NTN entity 610. Due to its elevation, NTN entity 610 may be better suited than TN entity 604 to handle the control plane signaling. In particular, the elevation of NTN entity 610 allows NTN entity 610 to "see" cells over a greater area than TN entity 604. Thus, a single NTN entity 610 may be able to handle a larger amount of control plane signaling, for a greater number of cells, than that of a single TN entity 604.

As the UE moves from TN cell 602(8) to TN cell 602(7) while remaining within NTN cell group 608 (e.g., associated with NTN entity 610), signaling to handover the UE to TN cell 602(7) is handled by NTN entity 610. In particular, control plane signaling is handled by NTN entity 610 such that handover commands from TN entity are replaced by secondary node change commands from NTN entity 610. Because this control plane signaling is offloaded to NTN entity 610, TN entity 604 is able to direct more resources for user plane traffic, which in-turn provides improved connectivity and service at the UE. Although DC may increase certain power consumptions at the UE, the improved signaling architecture may nevertheless improve overall power efficiency at the UE, such as by improving signal reception, avoiding retransmissions, etc. Similarly, the network may reduce power consumption by avoiding retransmissions.

Figure 7B:
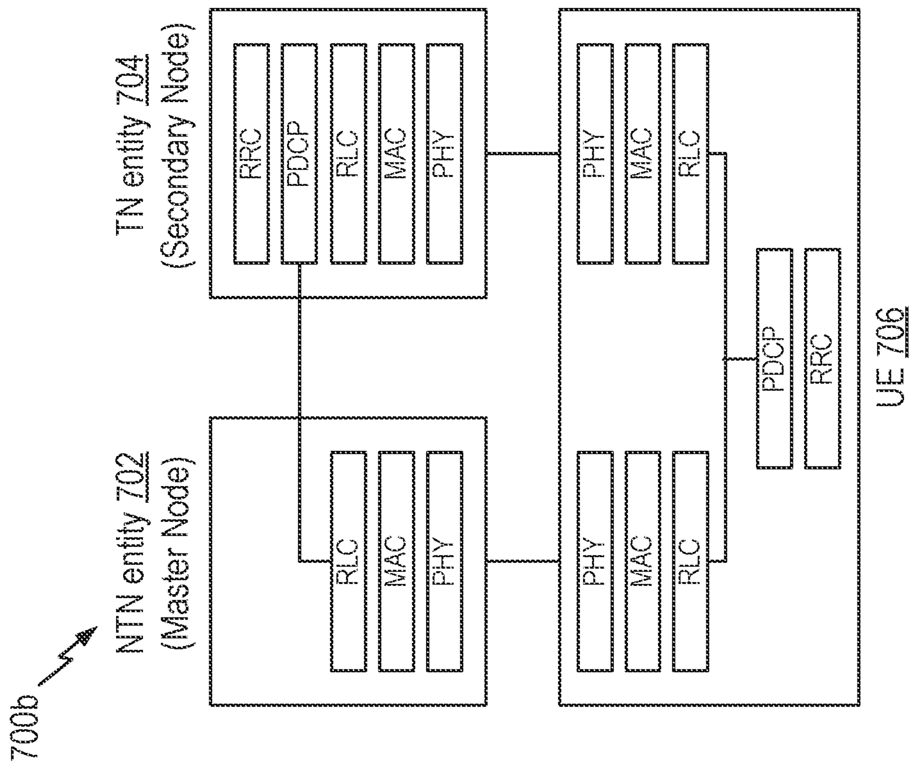
FIGS. 7A and 7B illustrate example signaling bearer splitting between a TN entity and an NTN entity in TN-NTN DC architecture.
Figure 7A:
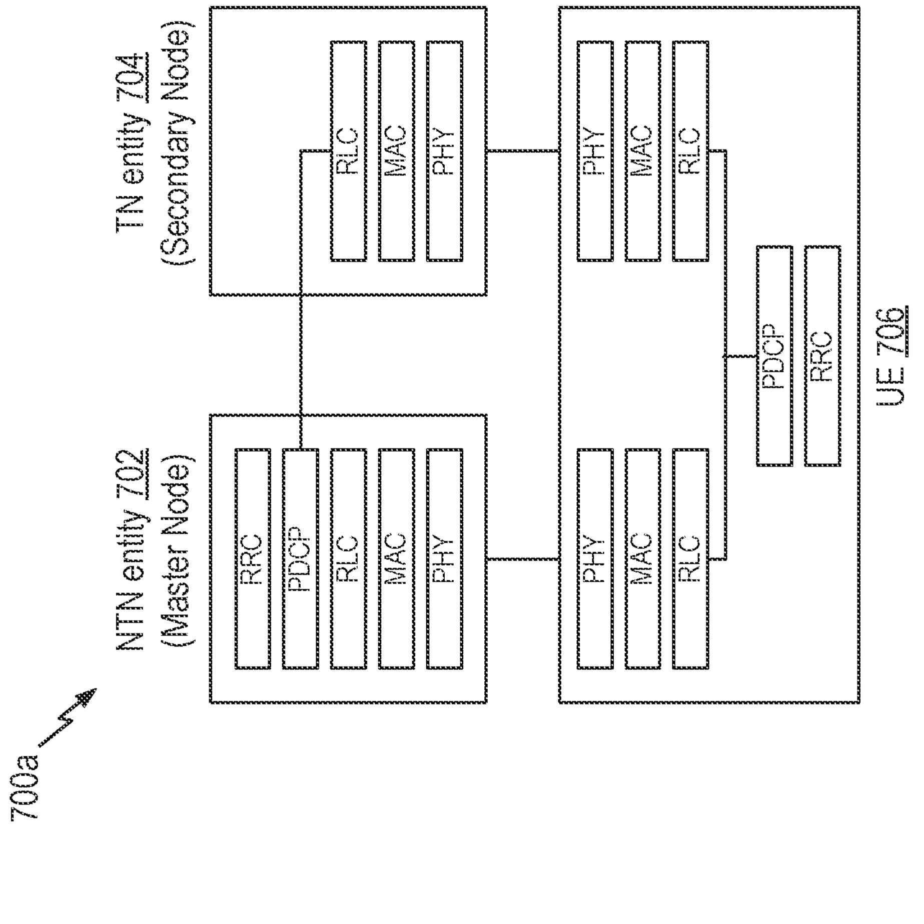

FIGS. 7A and 7B illustrate example signaling radio bearer (SRB) splitting 700*a*, 700*b* between a TN entity and an NTN entity in TN-NTN DC architecture. An SRB is a type of radio bearer that carries signaling message (i.e., RRC and/or non access stratum (NAS) message) is In particular, a bearer or internet protocol (IP) flow between multiple may be split between sending nodes, such as master and secondary nodes. The master node may be an NTN entity 702 (e.g., similar to NTN entity 502(1) in FIG. 5), and the secondary node may be a TN entity 704 (similar to TN entity 502(2) in FIG. 5) in the TN-NTN DC architecture. Control plane signaling is offloaded to NTN entity 702; however, TN entity 704 may be used for transmitting such signaling when NTN entity 702 is unavailable.

For example, as illustrated in FIG. 7A, control plane signaling, directed for a UE 706 and generated by NTN entity 702, generally passes through a protocol stack of NTN entity 702. The protocol stack of NTN entity 702 includes a radio resource control (RRC) layer, a packet data convergence protocol (PDCP) layer, a radio link control (RLC) layer, a medium access control (MAC) layer, and a physical (PHY) layer. Control plane signaling is processed through each layer of the protocol stack, and then transmitted to UE 706 when the signaling reaches the PHY layer of NTN entity 702. In some cases, however, NTN entity 702 may fail and/or connection between NTN entity 702 and UE 706 may become interrupted; thus, data splitting is performed at the PDCP layer of NTN entity 702 to transmit the signaling through the lower layers (e.g., an RLC layer, a MAC layer, and PHY layer) of the TN entity 704, instead of NTN entity 702. In some other cases, however, data splitting is performed at the PDCP layer of NTN entity 702 to transmit the signaling through the lower layers of TN entity 704 with or without a connection failure between the NTN entity 702 and UE 706 (e.g., depends on NTN entity 702 scheduled-ing).

Another example, illustrated in FIG. 7B, shows signaling originating from the TN entity 704, and directed for UE 706, passing through the RRC and PDCP layers of TN entity 704 and the RLC, MAC, and PHY layers of NTN entity 702. More specifically, data splitting is performed at the PDCP layer of TN entity 704 to transmit the signaling through the lower layers (e.g., the RLC layer, MAC layer, and the PHY layer) of NTN entity 702. In cases where NTN entity 702 fails and/or connection becomes interrupted, such data splitting may not occur. Instead, the signaling may pass through the entire protocol stack of TN entity 704 until the data reaches the PHY layer where it is then transmitted to UE 706.

Aspects Related to Fast Master Cell Group Link Recovery

As described above, in DC architecture, a UE is connected simultaneously to a master node and a secondary node. The UE can be configured to operate in CA with each node. The cells of the master node, where the UE is operating in CA, are referred to as the master cell group (MCG), while those of the secondary node are referred to as the secondary cell group (SCG).

Fast MCG link recovery procedures may be used to decrease the connection interruption time should a radio link failure (RLF) occur in the MCG. The fast MCG link recovery procedure utilizes SCG connectivity, in the DC architecture, to help reduce the service interruption time caused by MCG RLF (e.g., reduce service interruption time from several seconds down to a typical handover interruption time of 30-70 ms) to improve overall experience for end users.

Figure 8A:
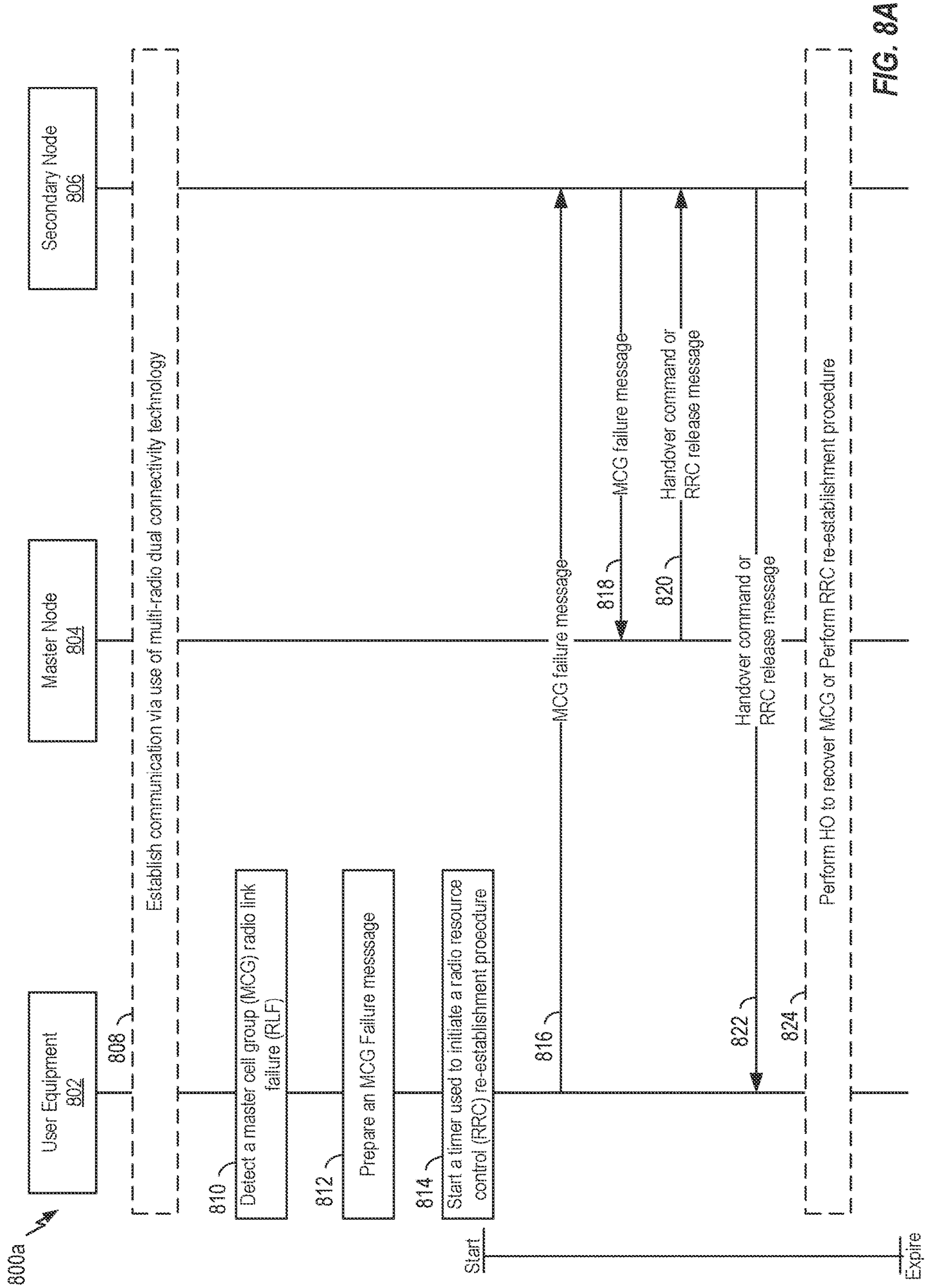
FIGS. 8A and 8B illustrate an example fast master cell group (MCG) link recovery procedure for a different scenarios in DC architecture.
Figure 8B:
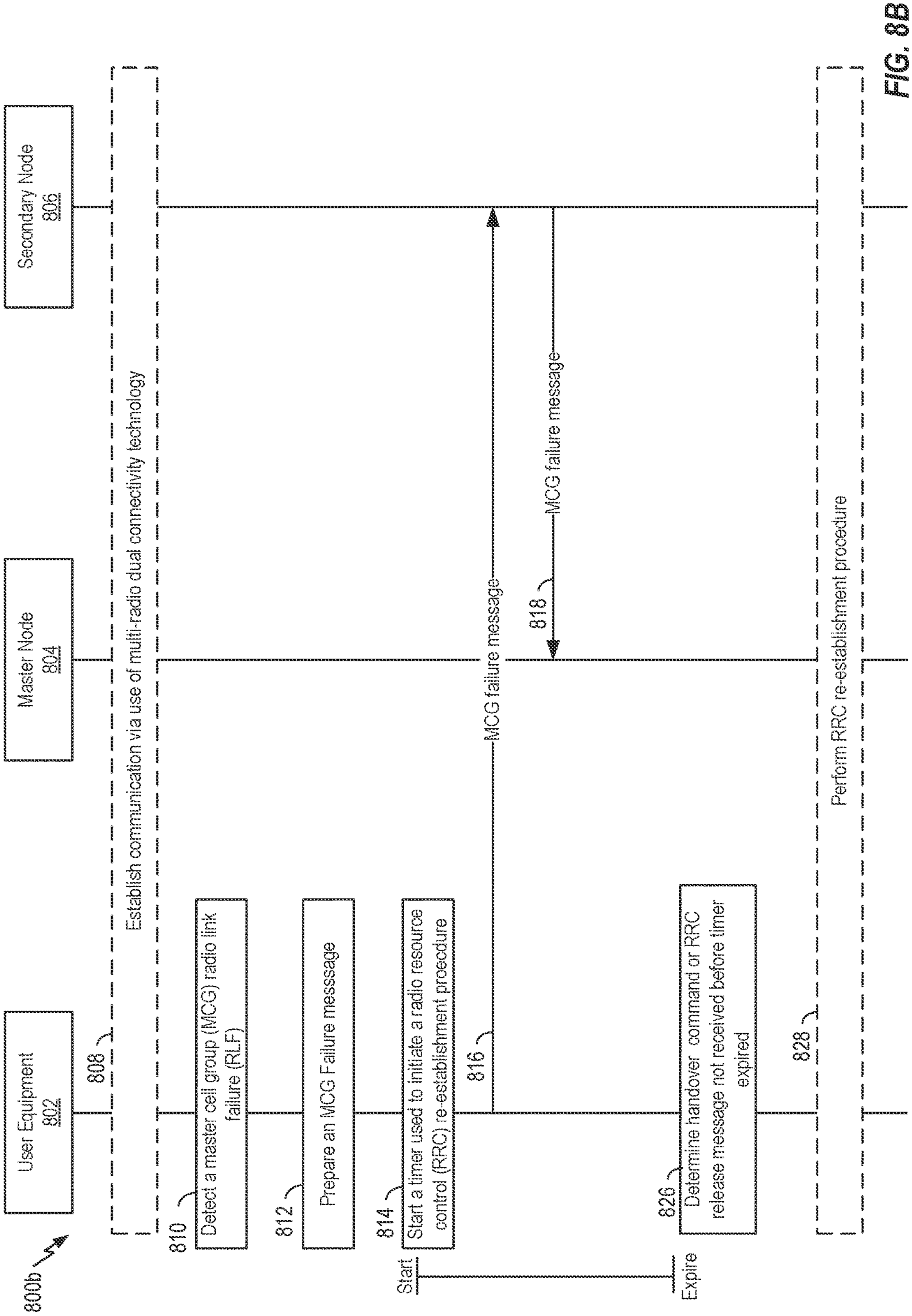

FIG. 8A illustrates an example fast MCG link recovery procedure 800*a* for a first scenario in DC. FIG. 8B illustrates another example fast MCG link recovery procedure 800*b* for a second scenario in DC. As illustrated in both FIGS. 8A and 8B, prior to initiating the fast MCG link recovery procedure 800*a* or 800*b*, a UE 802 establishes communication with a master node 804 and a secondary node 806 using multi-radio (MR)-DC. To improve signaling robustness, in the MR-DC, UE 802 is configured with a split SRB (e.g., described in FIGS. 7A and 7B), which enables transmission of RRC signaling via the MCG and/or SCG. That is, RRC messages, such as RRC Reconfiguration, can be sent using radio resources of the master node and/or the secondary node.

Subsequent to establishing communication with both master node 804 and secondary node 806, UE 802 monitors the downlink radio link quality of the MCG. In some cases, based on the monitoring, UE 802 detects, at 810, an RLF in the MCG. For example, UE 802, detecting loss of downlink synchronization, detecting that a maximum number of random access attempts has been reached, and/or detecting that a maximum number of RLC retransmissions has been reached, may determine an RLF has occurred.

Upon detecting the RLF, UE 802 in MR-DC does not immediately trigger an RRC re-establishment procedure (e.g., a procedure that would allow UE 802 to resume communication with the network after a temporary loss of connection due to an RLF). Instead, UE 802 suspends the MCG transmissions of all bearers and prepares, at 812, an MCGFailureInformation message, containing the reason for failure and any available measurements at the time of failure, in order to help the network take the appropriate action.

At 814, UE 802 starts a timer used to initiate an RRC re-establishment procedure. The timer, started at 814, may be a timer associated with the fast MCG link recovery procedure, such as a T316 timer specified in 3GPP. In particular, a T316 timer is a timer for performing an RRC re-establishment procedure after declaration of an MCG RLF. Upon expiration of the T316 timer, UE 802 may perform the RRC re-establishment procedure. As such, the T316 timer delays performance of this procedure in an attempt to restore connection of UE 802 with another cell in the MCG. Successful restoration of connectivity between UE 802 and another cell in the MCG results in only a short interruption of service to UE 802, and thus avoids the long interruption associated with cell reselection and the RRC re-establishment procedure.

At 816, UE 802 sends the MCGFailureInformation message to secondary node 806 via the SCG, using the SCG radio resources in a split SRB. Although transmission of the MCGFailureInformation message is illustrated as occurring subsequent to starting the timer, in other aspects, the timer is triggered when UE 802 transmits the MCGFailureInformation message. Further, in other aspects, transmission of the MCGFailureInformation message and initiation of the timer occur at the same time.

At 818, secondary node 806 forwards the MCGFailureInformation message to master node 804. Upon receiving the MCGFailureInformation message from UE 802, master node 804 determines the best action to address the MCG failure based on, for example, the measurement information received from UE 802. The action may be a reconfiguration to change a primary cell of UE 802 to a better cell (e.g., a target cell) to restore the MCG connectivity. As such, master node 804 may determine to send a handover command to UE 802 instructing UE to perform a handover to the target cell. Alternatively, if no suitable target cell is determined, the action is started to perform an RRC re-establishment procedure. As such, master node 804 may determine to send an RRC release message to UE 802 to release the connection.

As illustrated in FIG. 8A, master node 804 transmits the handover command or the RRC release message to UE 802 through secondary node 806 (e.g., shown at 820 and 822). In some cases, the handover command or the RRC release message is received by UE 802 prior to expiration of the timer started at step 814 (as shown in FIG. 8A), while in other cases, the handover command or the RRC release message is not received by UE 802 prior to expiration of the timer (as shown in FIG. 8B).

In cases where the handover command or the RRC release message is received prior expiration of the timer, UE 802 may perform one or more actions based on the received message, as shown at 824 in FIG. 8A. In particular, if a handover command is received, then UE 802 performs a handover to the indicated target cell in the handover command to recover the MCG connectivity. On the other hand, if an RRC release message is received, then UE 802 performs an RRC re-establishment procedure.

Alternatively, in cases where the handover command or the RRC release message is not received prior to expiration of the timer, an RRC re-establishment procedure is initiated, as shown in FIG. 8B. In particular, at 826 in FIG. 8B, UE determines that the timer, started at 814, has expired prior to receiving a handover command or an RRC release message from master node 804 (e.g., via secondary node 806). Accordingly, at 828, UE 802 begins initiate an RRC re-establishment procedure to resume communication with master node 804.

In contrast to UE-controlled RRC re-establishment procedures, the network remains in control during fast MCG failure recovery, as long as SCG connectivity is still available. The network can select the most appropriate action/reconfiguration, based on UE-provided measurement information, while also considering the network's overall situation (e.g., network load, subscription and service information, such as example quality of service (QOS) of active bearers of the UE, etc.).

Figure 9:
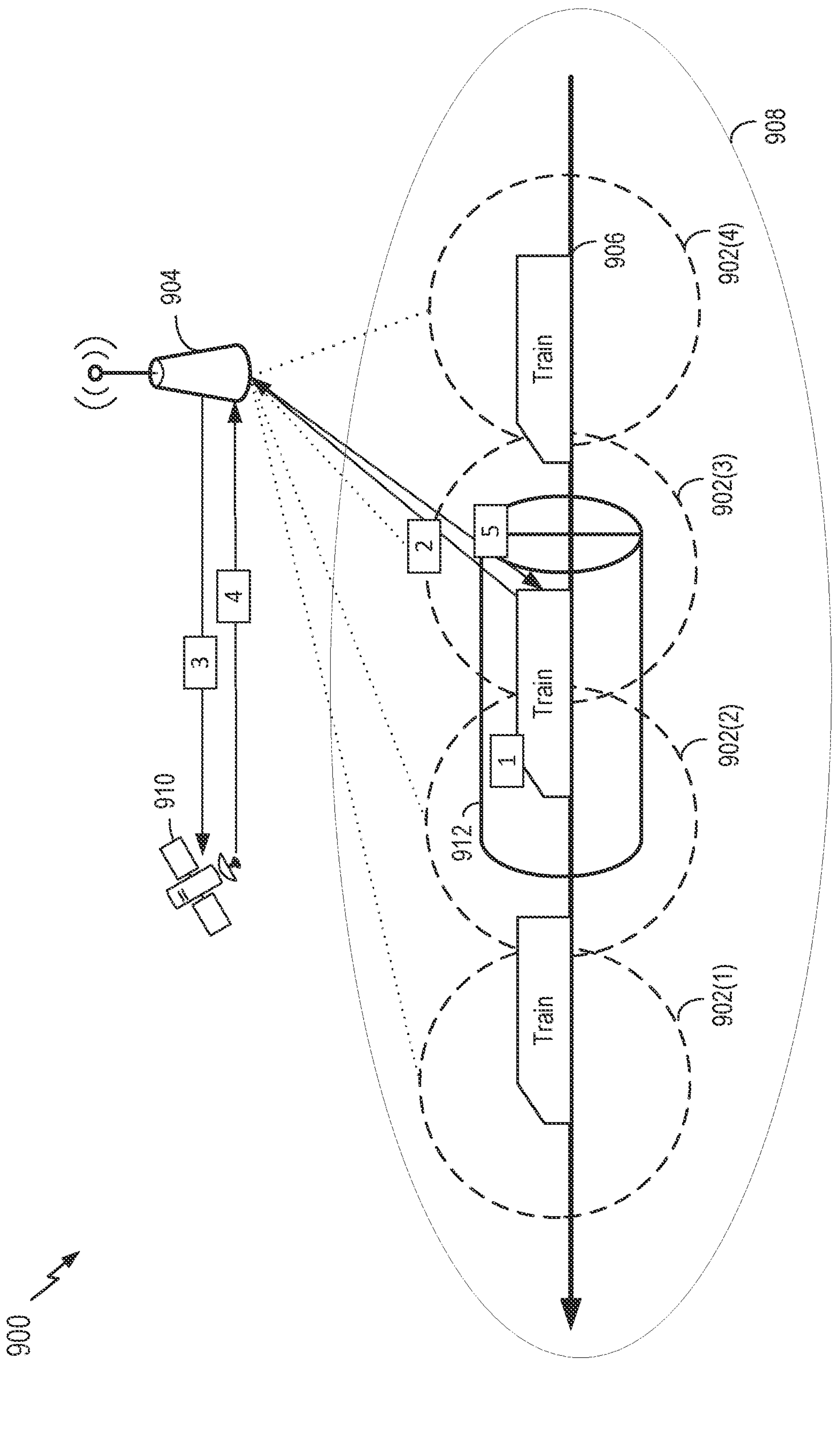
FIG. 9 illustrates the use of fast MCG link recovery operations to restore connection to an NTN entity in TN-NTN DC architecture.

Aspects Related to Fast Master Cell Group Link Recovery in Terrestrial Network-Non-Terrestrial Network Dual Connectivity Scenarios FIG. 9 illustrates the use of radio link management procedures (e.g., illustrated in FIGS. 8A and 8B) to restore connection to an NTN entity in TN-NTN DC architecture 900. As illustrated, similar to FIG. 6B described above, a UE, positioned on a train 906, is traveling at high speed through an urban area. The UE is connected to both a TN entity 904 and an NTN entity 910.

In this example, NTN entity 910 acts as a master node that provides radio resources to the UE. TN entity 904 acts as a secondary node that also provides radio resources to the UE. An NTN cell group 908, also referred to as the MCG, is associated with NTN entity 910. Multiple TN cells 902(1)-(4) (collectively referred to herein as TN cells 902 and individually referred to herein as TN cell 902), associated with TN entity 904, congest and overlap in the urban area. TN cells 902 are referred to as the SCG.

TN entity 904 is configured to handle user plane signaling from the UE and offload control plane signaling to NTN entity 910. NTN entity 910 is configured to handle the offloaded control plane signaling. Accordingly, radio resources at TN entity 904 are utilized to handle user plane signaling, while radio resources at NTN entity 910 are utilized to handle control plane signaling.

As the UE moves from one TN cell 602 to the next, multiple handover procedures are performed. For example, when traveling (e.g., in the left direction) from TN cell 902(4) to 902(3), a handover procedure is performed to transfer cell connectivity of the UE from TN cell 902(4) to TN cell 902(3).

In some cases, the UE, when positioned on train 906, detects an RLF for a serving cell of the UE (shown at step 1 in FIG. 9). Detection of the RLF for the serving cell is an example of operation 810 in FIGS. 8A and 8B.

In this example, the RLF may occur as a result of the UE traveling through a tunnel 912. In particular, the serving cell (e.g., NTN cell associated with NTN entity 910) may experience temporary out-of-coverage (OOC) due to the non-line-of-sight (NLOS) environment experienced when entering tunnel 912. NLOS refers to the path of propagation of a radio frequency (RF) that is obscured (partially or completely) by obstacles, thus making it difficult for the radio signal to pass through.

Upon detecting the RLF, the UE suspends the MCG transmissions of all bearers. Further, the UE prepares and sends, at step 2, an MCGFailureInformation message, containing the reason for failure and any available measurements at the time of failure, in order to help the network take the appropriate action (e.g., similar to operations 812 and 816 in FIGS. 8A and 8B). The MCGFailureInformation message is received by TN entity 904 and forwarded to NTN entity 910, at step 3. Upon transmission of the MCGFailureInformation message, the UE may also start a timer (e.g., a T316 timer) used to trigger an RRC re-establishment procedure.

In response to receiving the MCGFailureInformation message from the UE, NTN entity 910 determines the best action to address the MCG failure based on, for example, the measurement information received from the UE. For example, the UE may determine to send to the UE, at step 3, (1) a handover command instructing the UE to perform a handover to a target cell indicated by NTN entity 910 or (2) an RRC release message to release and re-establish a connection. The handover command or the RRC release message is received by TN entity 904 and forwarded to the UE, at step 4. For this example, it may be assumed that the handover command or the RRC release message is received prior to expiration of the timer used to trigger the RRC re-establishment procedure (e.g., the T316 timer).

The UE may take action to re-establish connection with NTN entity 910 based on receiving the handover command or the RRC release message. As such, the fast MCG link recovery procedure used to re-establish control plane communication with NTN entity 910 may be completed without any interruption to user plane communication via the SCG of TN entity 904.

The amount of time the NTN cell may be OOC (e.g., due to the NLOS environment of tunnel 912), in the example illustrated in FIG. 9, may depend on one or more factors, such as the velocity of the UE/train 906 as it travels through tunnel 912 and the length of tunnel 912. However, timing of performing the different operations of the fast MCG link recovery procedure, illustrated in FIGS. 8A and 8B, are static. For example, a timer period for the T316 timer, used in the link recovery procedure, is configured and indicated as a static value in the 3GPP specification. Although the timer period may be useful to initiate the RRC re-establishment procedure in some cases, in some other cases, the timer period may be overly conservative. As such, an RRC re-establishment procedure may be delayed (e.g., due to the excessive length of the timer period), especially in cases where it is clear that the NTN entity is unable to respond. As such, advantages of using the fast MCG link recovery procedure to reduce interruption time during MCG RLF detection may not be realized. Static timing for performing other operations of the MCG link recovery procedure may also contribute to the prolonged interruption period. The aforementioned technical problems, including prolonged periods of connectivity disruption, result when using conventional radio link management procedures; thus, improved techniques for radio link management are desired.

Example Operations of Entities in a Communications Network for Performing Radio Link Management Procedures In order to overcome technical problems associated with fixed timing of conventional radio link management procedures, such as those described above with respect to FIGS. 8A, 8B, and 9, aspects described herein enable a UE to dynamically adjust timing for performing one or more steps of the radio link management procedure.

In certain aspects, the one or more cells associated with the network node are cells belonging to an MCG associated with a master node previously in communication with the UE. For example, the UE may have been previously connected simultaneously to a master node and a secondary node, using MR DC, and configured to operate in CA with each node. Radio link monitoring and failure detection may be performed by the UE to detect an RLF for the MCG. Further, in response to detecting the failure, the UE may initiate steps to recover the failed radio link via the secondary node.

In certain aspects, the master node is an NTN entity, and the secondary node is a TN entity in a TN-NTN environment, as described above with respect to FIG. 5. Although aspects herein are described with respect to dynamically adjusting timing for performing one or more steps of radio link management procedures in TN-NTN DC architecture, similar techniques may be applied in other environments where a UE has DC two network entities (or multi-connectivity to two or more network entities). For example, aspects herein may be applied for any radio access technology (RAT) (e.g., LTE, 5G, 6G, etc.), any network node (e.g., TN entity, NTN entity, etc.), core network type (e.g., evolved packet core (EPC), 5G core (5GC), 6G core (6GC), and/or any orbit type, where an orbit exists (e.g., geosynchronous orbit (GSO), non-geosynchronous orbit (NGSO), etc.).

In particular, a UE may be configured to dynamically adjust a timing for performing one or more steps of such radio link management procedures, for example, to recover a failed radio link associated with an MCG. As described below with respect to FIG. 10, in some cases, the UE adjusts the timing for performing step(s) of the radio link management procedure based on conditions of the UE (e.g., a location of the UE, a velocity of the UE, etc.). Further, as described below with respect to FIG. 11, in some cases, the UE adjusts the timing for performing step(s) of the radio link management procedure based on instructions to adjust the timing, generated and transmitted to the UE by the secondary node in communication with the UE. Further, as described below with respect to FIG. 12, in some cases, the UE adjusts the timing for performing step(s) of the radio link management procedure based on instructions to adjust the timing, generated and transmitted to the UE by the master node, previously in communication with the UE, via the secondary node.

Figure 10:
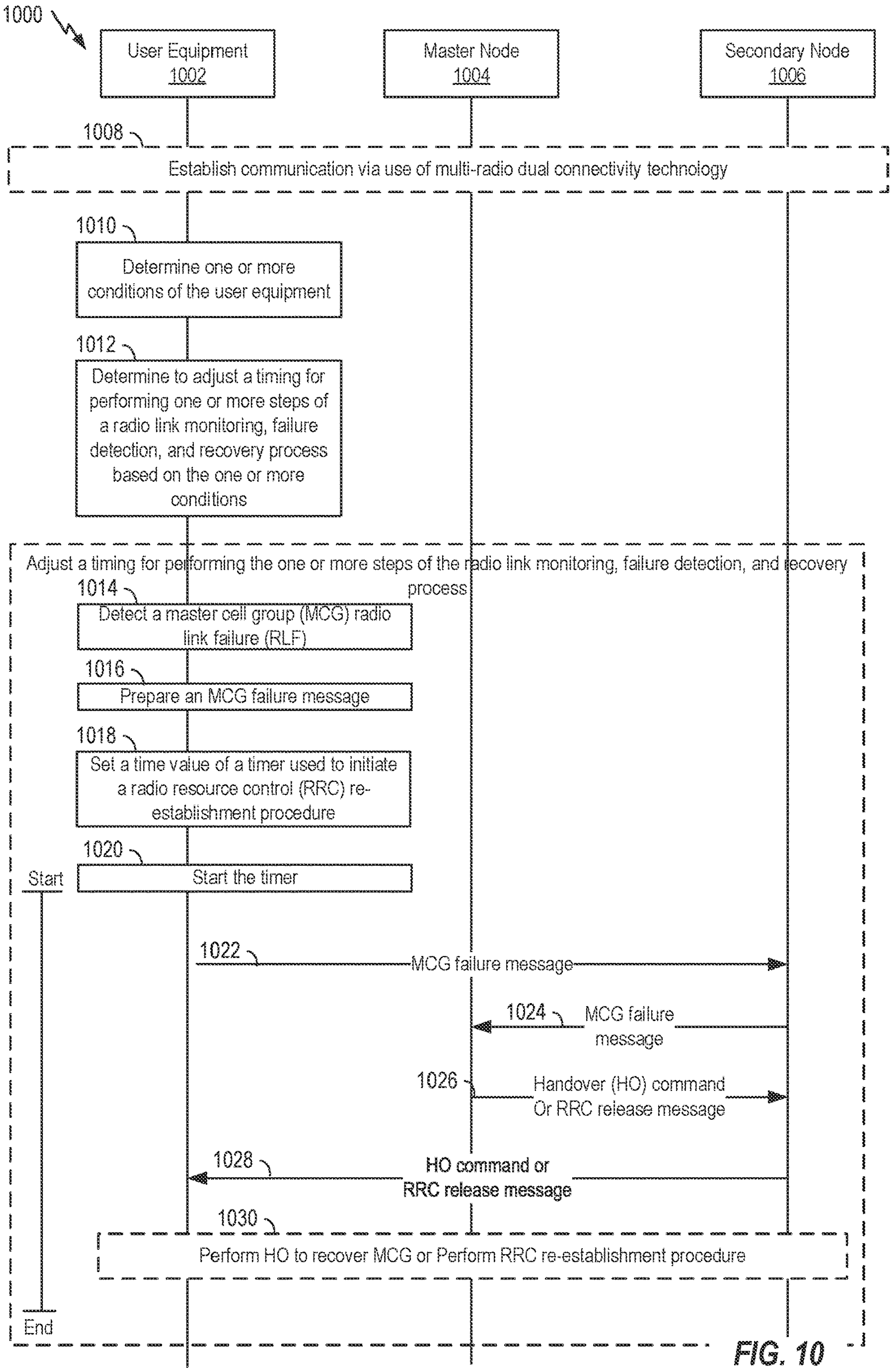
FIG. 10 depicts a process flow for communications in a network between a UE, a master node, and a secondary node for performing a radio link monitoring, failure detection, and recovery process in DC architecture.
Figure 11:
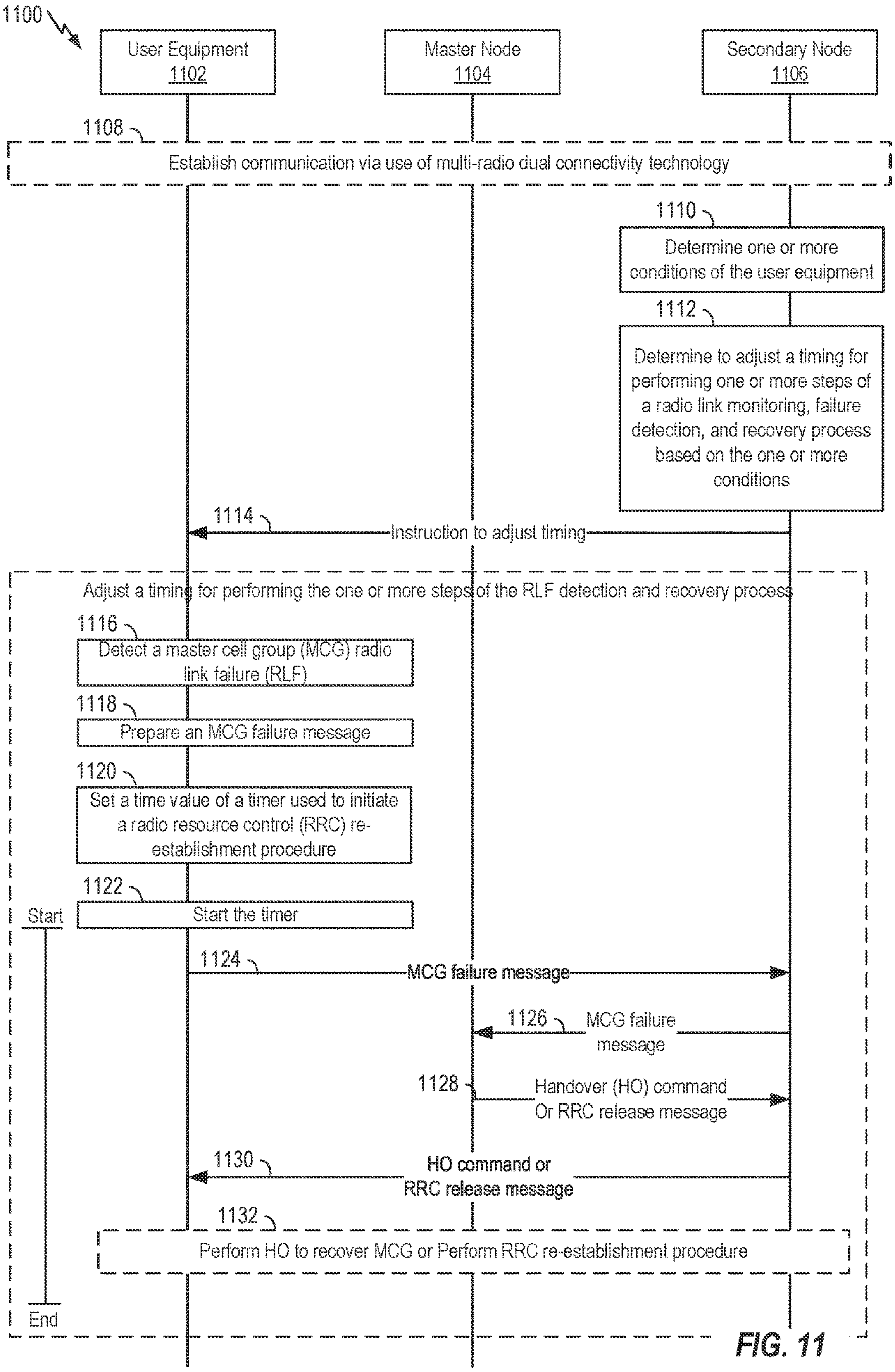
FIG. 11 depicts another process flow for communications in a network between a UE, a master node, and a secondary node for performing a radio link monitoring, failure detection, and recovery process in DC architecture.
Figure 12:
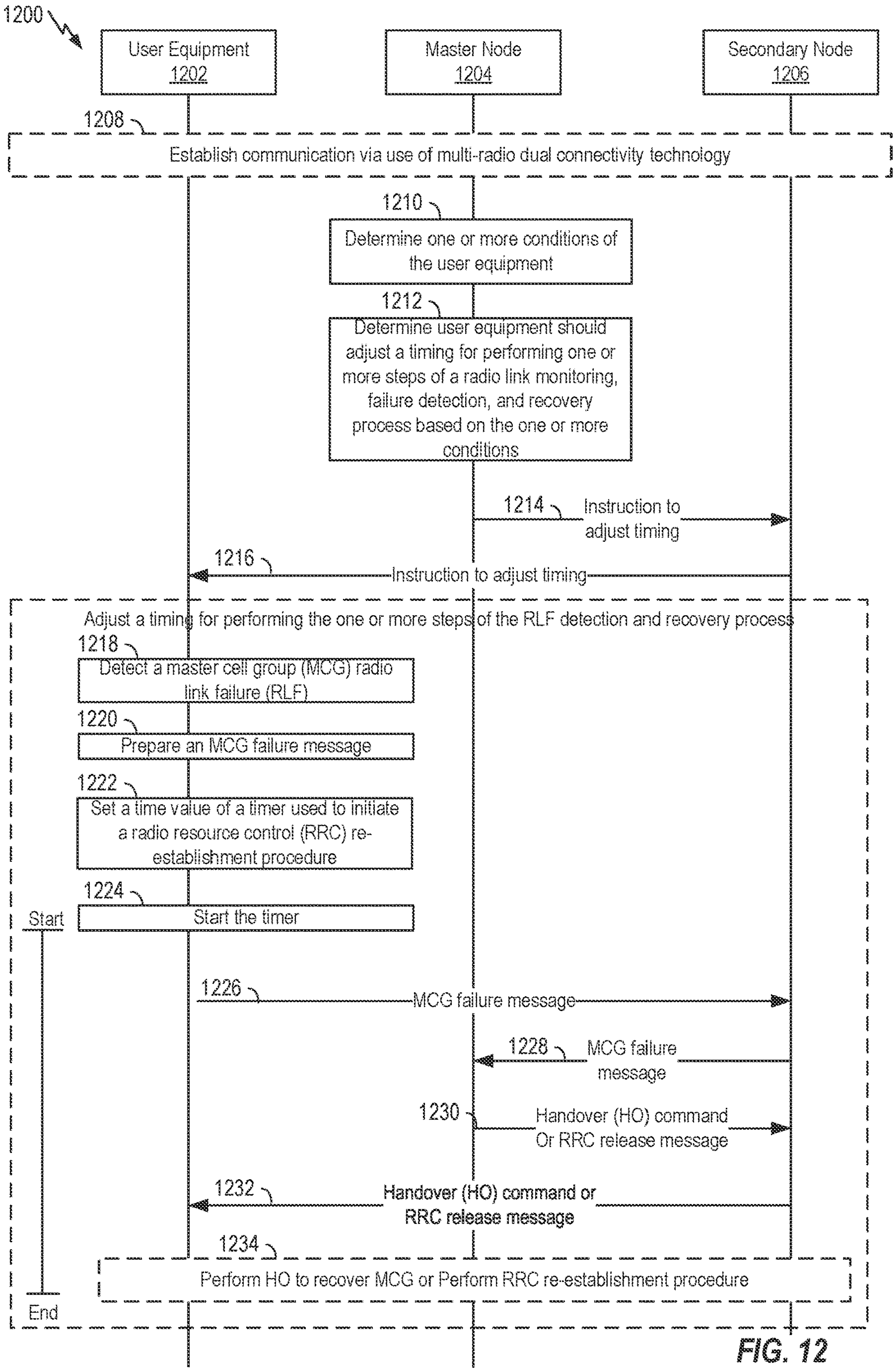
FIG. 12 depicts another process flow for communications in a network between a UE, a master node, and a secondary node for performing a radio link monitoring, failure detection, and recovery process in DC architecture.

FIGS. 10, 11, and 12 depicts process flows 1000, 1100, and 1200, respectively, for communications in a network between a UE 1002, 1102, 1202, a master node 1004, 1104, 1204, and a secondary node 1006, 1106, 1206. In some aspects, the master node and secondary nodes are examples of the BS 102 depicted and described with respect to FIGS. 1 and 3 or a disaggregated BS depicted and described with respect to FIG. 2. Similarly, the UE may be an example of UE 104 depicted and described with respect to FIGS. 1 and 3. However, in other aspects, UE 104 may be another type of wireless communications device and BS 102 may be another type of network entity or network node, such as those described herein. For example, the master node may be an NTN entity, and the secondary node may be a TN entity.

As shown in process flow 1000 of FIG. 10, at step 1008, UE 1002 establishes communication with both master node 1004 and secondary node 1006 in a MR-DC configuration.

At 1010, UE 1002 determines one or more conditions of UE 1002. The one or more conditions may include, for example, a location of UE 1002, a time, a velocity of UE 1002, a searching period of a serving cell (e.g., a primary cell or a cell associated with master node 1004) of UE 1002, a searching time of the serving cell of UE 1002, a frequency of the serving cell of UE 1002, a RAT of the serving cell of UE 1002, a network type of the serving cell of UE 1002, an orbit of the serving cell of the UE 1002. In certain aspects, a network type of the serving cell of UE 1002 includes a TN or an NTN. These conditions may have been previously configured by a network entity (e.g., such as master node 1004 and/or secondary node 1006).

In certain aspects, the one or more conditions further include a capability of UE 1002. For example, in certain aspects, UE 1002 may be configured such that UE 1002 is capable of adjusting timing for one or more steps of a radio link management procedure.

At step 1012, UE 1002 determines to adjust a timing for performing one or more steps of a radio link management procedure for a radio link of one or more cells. UE 1002 determines to adjust the timing for performing one or more of the steps based on the one or more conditions determined at step 1010. For example, where UE 1002 is configured and capable of performing such dynamic timing adjustments, UE 1002 determines the timing of the radio link management procedure may be fine-tuned based on one or more other conditions oft UE 1002.

Based on making this determination, UE 1002 adjusts a timing for performing one or more steps of the radio link management procedure for the radio link. The one or more steps include steps 1014-1030 illustrated in FIG. 10. Steps 1014-1030 are similar to steps of the radio link management procedure illustrated in FIGS. 8A and 8B; however, steps 1014-1030 may be performed based on timing determined by UE 1002. Further, steps 1014-1030 include UE 1002 setting a timer value for a timer (e.g., period of time from start to expiration of the timer) user to initiate an RRC re-establishment procedure for the radio link (e.g., process illustrated in FIGS. 8A and 8B used a static value for the timer).

In certain aspects, adjusting the timing for performing a step of the radio link management procedure involves extending (or lengthening) the timing to delay performance of the step (e.g., based on timing currently specified in a specification, such as 3GPP). For example, in some cases to extend the timing of performing a step of the process, UE 1002 determines whether one or more conditions for performing the step are met and starts a timer after determining the one or more conditions are met. UE 1002 may then delay performance of the step until an expiration of the timer.

As described above, a timing for performing some steps of the radio link management procedure are already based on an existing timer (e.g., given a configured timer value). For example, in the 3GPP specification, initiating an RRC re-establishment procedure for a failed radio link is performed when a T316 timer expires. In such cases, to delay the timing of performing the step of the process already associated with a timer, UE 1002 may determine when the timer is about to expire and restart the timer prior to the expiration of the timer. UE 1002 may then delay performance of the step until an expiration of the timer.

As another example, in some cases, to delay the timing of performing the step of the process already associated with a timer, UE 1002 increases a time value configured for the timer. For example, the configured time value may be five seconds, and UE 1002 may extend this value to be ten seconds. UE 1002 may then delay performance of the step until an expiration of the timer, where the expiration of the timer occurs after an amount of time equal to the extended time value configured for the timer has passed.

As another example, in some cases, to delay the timing of performing the step of the process already associated with a timer, UE 1002 increases a time value configured for the timer by applying a scaling factor to the time value configured for the timer. The scaling factor applied by UE 1002 in this case is greater than one. For example, the configured time value may be five seconds, and UE 1002 may extend this time by applying a scaling factor of two, such that the configured time value with the scaling factor applied is equal to ten seconds. UE 1002 may then delay performance of the step until an expiration of the timer, where the expiration of the timer occurs after an amount of time equal to the time value configured for the timer with the scaling factor applied has passed.

In certain aspects, adjusting the timing for performing a step of the radio link management procedure involves canceling performance of the step. Cancelling performance may be used to terminate a step for which UE 1002 has already begun performance. In some cases, to cancel performance of the step, UE 1002 is configured to start a timer and to perform the step after the timer expires, but the timer may be set such as to never expire or to expire after a protracted period of time that is unlikely to ever be met.

In certain aspects, adjusting the timing for performing a step of the radio link management procedure involves disabling performance of the step. Disabling performance may be used to avoid initiating performance of a step that UE 1002 has not begun performing.

In certain aspects, adjusting the timing for performing a step of the radio link management procedure involves suspending performance of the step. For example, in some cases, UE 1002 is configured to refrain from performing the step until an indication to resume or begin the step is received from a network entity (such as master node 1004 or secondary node 1006). For example, UE 1002 may refrain from transmitting, at 1022, an MCGFailureInformation message until an indication to resume or begin the step is received from secondary node 1006.

In certain aspects, adjusting the timing for performing a step of the radio link management procedure involves shortening (or advancing) the timing for performing the step (e.g., based on timing currently specified in the 3GPP specification). In such cases, to advance the timing of performing the step of the process already associated with a timer, UE 1002 may determine when the timer is expected to expire (e.g., based on the configured time value) and terminate the timer prior to its expiration. Terminating the timer prior to its expiration may include setting a timer value configured for the timer value to a smaller value such that the timer expires at an earlier time. UE 1002 may then perform the step based on when the timer expires (e.g., where the timer expires earlier in time). For example, assuming a T316 time is configured to expire within a five second period of time, UE 1002 may terminate the timer at three seconds and perform the step associated with the timer.

As another example, in some cases, to advance the timing of performing the step of the process already associated with a timer, UE 1002 reduces a time value configured for the timer. For example, the configured time value may be five seconds, and UE 1002 may reduce this value to three seconds. UE 1002 may then perform the step at an expiration of the timer, where the expiration of the timer occurs after an amount of time equal to the reduced time value configured for the timer has passed.

As another example, in some cases, to advance the timing of performing the step of the process already associated with a timer, UE 1002 reduces a time value configured for the timer by applying a scaling factor to the time value configured for the timer. The scaling factor applied by UE 1002 is less than one. For example, the configured time value may be five seconds, and UE 1002 may reduce this time by applying a scaling factor of 0.2, such that the configured time value with the scaling factor applied is equal to one second. UE 1002 may then then perform the step at an expiration of the timer, where the expiration of the timer occurs after an amount of time equal to the time value configured for the timer with the scaling factor applied has passed.

It is noted that the above-described actions for adjusting the timing for performing one or more steps of the radio link management procedure are not an exhaustive list, and other methods of dynamically adjusting the timing may be implemented.

As described above, in some cases, the UE adjusts the timing for performing step(s) of the radio link management procedure based on instructions to adjust the timing, generated and transmitted to the UE by the master node previously in communication with the UE or the secondary node in communication with the UE.

For example, as shown in process flow 1100 of FIG. 11, at step 1108, similar to step 1008 of process flow 1000, UE 1102 establishes communication with both master node 1104 and secondary node 1106 via MR-DC configuration. However, instead of UE 1102 determining one or more conditions of UE 1102 (as shown in process flow 1000), secondary node 1106 determines, at step 1110, one or more conditions of UE 1002. In certain aspects, the one or more conditions include a capability of UE 1102. For example, in certain aspects, UE 1102 is configured to be capable of adjusting timing for one or more steps of a radio link management procedure.

At step 1112, secondary node 1106 determines to adjust a timing for performing one or more steps of a radio link monitoring, failure detection, or recovery process for a radio link of one or more cells. Secondary node 1106 determines to adjust the timing for performing one or more of the steps based on, at least, the one or more conditions determined at step 1010 (e.g., based on a capability of UE 1102).

Based on making this determination, secondary node 1106 transmits, at step 1114, to UE 1102, instructions to adjust the timing of performing at least one of steps of the radio link management procedure. The instructions may be received by UE 1102 via an RRC layer, a packet data convergence protocol (PDCP) layer, a radio link control (RLC) layer, a medium access control (MAC) layer, a physical (PHY) layer, or downlink control information (DCI) (e.g., layer 1 (L1) signaling). As such, timing for performing step(s) of the process (e.g., steps 1116-1132) may be based on the instructions transmitted to UE 1102 from secondary node 1106.

As another example, as shown in process flow 1200 of FIG. 12, at step 1208, similar to step 1008 of process flow 1000 and step 1108 of process flow 1100, UE 1202 establishes communication with both master node 1204 and secondary node 1206 via MR-DC configuration. However, instead of UE 1202 determining its own conditions (as shown in process flow 1000) or secondary node 1206 determining one or more conditions of UE 1202 (as shown in process flow 1200), master node 1206 determines, at step 1210, one or more conditions of UE 1202. In certain aspects, the one or more conditions include a capability of UE 1202.

For example, in certain aspects, UE 1202 is configured such that UE 1202 is capable of adjusting timing for one or more steps of a radio link management procedure.

At step 1212, master node 1204 determines to adjust a timing for performing one or more steps of a radio link management procedure for a radio link of one or more cells. Master node 1206 determines to adjust the timing for performing one or more of the steps based on, at least, the one or more conditions determined at step 1210 (e.g., based on a capability of UE 1202).

Based on making this determination, master node 1206 transmits, at 1214 and 1216, to UE 1202, instructions to adjust at least one of steps of the radio link management procedure. Master node 1206 transmits these instructions to UE 1202 by first transmitting the instructions to secondary node 1206, at step 1214, and then secondary node 1206 forwarding the instructions to UE 1202, at step 1216. The instructions may be received by UE 1202 via an RRC layer, a PDCP layer, an RLC layer, a MAC layer, a PHY layer, or DCI. As such, timing for performing step(s) of the process (e.g., steps 1218-1234) may be based on the instructions transmitted to UE 1102 from master node 1206.

Because timing for performing each of the steps of the radio link management procedure is dynamically determined, a most appropriate timing for performing each of the steps may be selected, given the circumstances, such that the least amount of interruption time is experienced in the radio link management procedure. Reducing interruption time may provide a technical advantage by improving overall connectivity, as well as avoid wasting resources to perform resource-intensive procedures (e.g., RRC re-establishment procedures) where such procedures are not necessary to re-establish a connection with a network In certain aspects, when performing steps of the radio link management procedure for a radio link of the MCG, UE 1202 continues to perform radio link measurements for a primary cell of the MCG previously serving UE 1202. UE 1202 may perform such measurements subsequent to each step that is performed in the radio link management procedure to determine whether the previously-failed connection with the MCG has been re-established. In some cases, based on the radio link measurements, the UE determines that the primary cell is recovered. As such, the UE may autonomously resume MCG transmission by performing an uplink transmission with the MCG. For example, the uplink transmission may be transmitted via a physical random access channel (PRACH), a physical uplink shared channel (PUSCH), or a physical uplink control channel (PUCCH).

In certain aspects, when performing steps of the radio link management procedure for a radio link of the MCG, the UE 1202 may receive, from a network entity (e.g., a secondary node), a handover command or a message indicating to resume uplink transmission via the radio link that previously failed (e.g., for which the radio link management procedure was initiated). Based on receiving the handover command or the message, the UE may perform the uplink transmission.

In certain aspects, when performing steps of the radio link management procedure for a radio link of the MCG, the UE may also detect a radio link failure for the SCG. In some cases, upon SCG failure detection, the UE may avoid any delay/disable/suspension determined to be applied to one or more steps of the process. For example, a better option may be for the UE to identify a new suitable cell of the MCG to re-establish communication with the master node. As such, the UE may cancel the delay/disable/suspension determined to be applied to one or more steps of the process. In some other cases, upon SCG failure detection, the UE terminates performance of the one or more steps of the radio link management procedure and initiates an RRC re-establishment procedure.

Although aspects herein are described with respect to dynamically adjusting timing for performing one or more steps of a radio link management procedure for an NTN radio link failure, similar techniques may be applied in other failure scenarios. For example, aspects described herein may be applicable to primary cell (PCell) downlink out-of-sync scenarios (T310 expiry), link establishment failure scenarios (T312 expiry), MCG PCell random access problem scenarios, uplink listen before talk (LBT) failure scenarios, beam failure while deactivated state scenarios, and/or uplink sync failure scenarios.

Further, although aspects herein are described with respect to dynamically adjusting timing for performing one or more steps of a radio link management procedure for NTN-TN DC scenarios where a network type of the MCG is an NTN and a network type of the SCG is a TN, similar techniques may be applied in NTN-TN dual connectivity scenarios where the network type of the MCG is a TN and the network type of the SCG is an NTN. For example, in such cases, the UE may delay/disable SCG radio link monitoring and/or SCGFailureInformation reporting based on the UE's state, location, time, etc.

Additionally, although aspects herein are described with respect to dynamically adjusting timing for performing one or more steps of a radio link management procedure for NTN-TN DC scenarios, similar techniques may be applied in NTN single connectivity scenarios. For example, in NTN single connectivity scenarios, In NTN single connectivity case, the UE may delay/disable radio link monitoring based on the UE's state, location, time, etc.

Example Operations by a User Equipment

Figure 13:
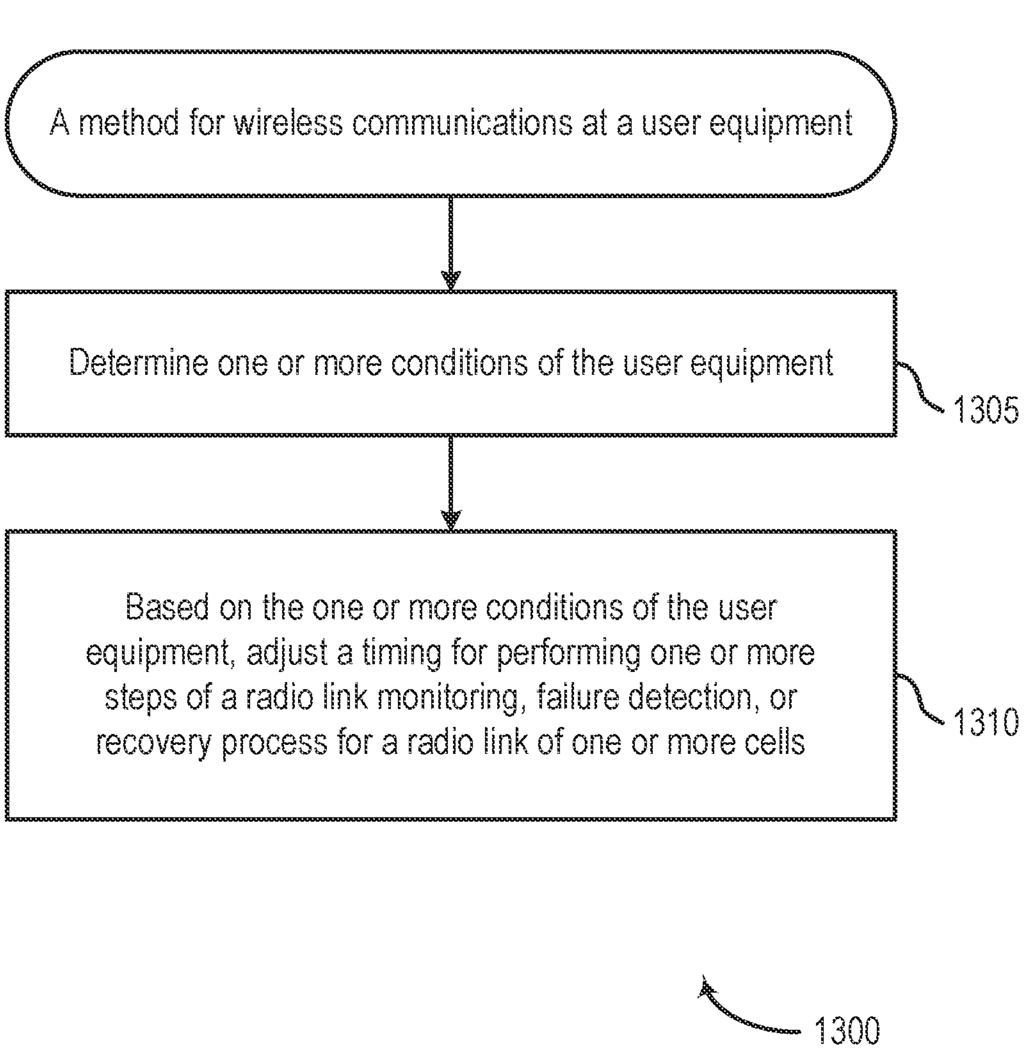
FIG. 13 depicts a method for wireless communications.

FIG. 13 shows a method 1300 for wireless communications at a user equipment, such as UE 104 of FIGS. 1 and 3.

Method 1300 begins at step 1305 with determining one or more conditions of the user equipment.

Method 1300 then proceeds to step 1310 with, based on the one or more conditions of the user equipment, adjusting a timing for performing one or more steps of a radio link monitoring, failure detection, or recovery process for a radio link of one or more cells.

In one aspect, the one or more conditions include: a location of the user equipment, a time, a velocity of the user equipment, a searching period of a serving cell of the user equipment, a searching time of the serving cell of the user equipment, a frequency of the serving cell of the user equipment, a radio access technology of the serving cell of the user equipment, a network type of the serving cell of the user equipment, wherein the network type comprises a terrestrial network or a non-terrestrial network, an orbit of the serving cell of the user equipment, or a capability of the user equipment.

In one aspect, the serving cell of the user equipment comprises a primary cell.

In one aspect, the one or more conditions were configured by a network entity.

In one aspect, step 1310 includes delaying the timing.

In one aspect, to delay the timing for a step, the method 1300 includes: starting a timer after one or more conditions for performing the step are met; and performing the step at an expiration of the timer.

In one aspect, a timing of performing a step of the one or more steps is based on a timer; and to delay the timing of performing the step, the method 1300 includes: restarting the timer prior to an expiration of the timer; and performing the step after the expiration of the timer.

In one aspect, a timing of performing a step of the one or more steps is based on a timer; and to delay the timing of performing the step, the method 1300 includes: extending a time value configured for the timer; and performing the step after the timer expires, wherein an expiration of the timer occurs after an amount of time equal to the extended time value configured for the timer has passed.

In one aspect, a timing of performing a step of the one or more steps is based on a timer; and to delay the timing of performing the step, the method 1300 includes: applying a scaling factor to a time value configured for the timer, wherein the scaling factor is greater than one; and performing the step after the timer expires, wherein an expiration of the timer occurs after an amount of time equal to the time value configured for the timer with the scaling factor applied has passed.

In one aspect, step 1310 includes canceling the one or more steps.

In one aspect, to disable the timing for a step, the method 1300 includes starting a timer and performing the step after the timer expires, wherein the timer is set up to never expire or a specific value.

In one aspect, step 1310 includes disabling the one or more steps.

In one aspect, step 1310 includes suspending the one or more steps.

In one aspect, to suspend the timing for a step, the method 1300 includes refraining from performing the step until an indication to resume the step is received from a network entity.

In one aspect, step 1310 includes advancing the timing.

In one aspect, a timing of performing a step of the one or more steps is based on a timer; and to advance the timing of performing the step, the method 1300 includes: terminating a timer prior to an expiration of the timer; and performing the step based on the termination.

In one aspect, a timing of performing a step of the one or more steps is based on a timer; and to advance the timing for the step, the method 1300 includes: reducing a time value configured for the timer; and performing the step at an expiration of the timer, wherein the expiration of the timer occurs after an amount of time equal to the reduced time value configured for the timer has passed.

In one aspect, a timing of performing a step of the one or more steps is based on a timer; and to advance the timing of performing the step, the method 1300 includes: applying a scaling factor to a time value configured for the timer, wherein the scaling factor is less than one; and performing the step after the timer expires, wherein an expiration of the timer occurs after an amount of time equal to the time value configured for the timer with the scaling factor applied has passed.

In one aspect, at least one of the one or more steps of the radio link monitoring, failure detection, or recovery process adjusted by the user equipment includes at least one of: a monitoring time for monitoring the radio link, a detection time for a failure of the radio link, an initiation time for a timer used to initiate a RRC re-establishment procedure, an expiration time for the timer used to initiate the RRC re-establishment procedure, a sending time for a failure message, or an initiate time for the RRC re-establishment procedure.

In one aspect, method 1300 further includes receiving, from a network entity, instruction to adjust at least one of the one or more steps, wherein adjusting the timing for performing the one or more steps is further based on the instruction received from the network entity.

In one aspect, the one or more cells belong to a MCG associated with a master node previously in communication with the user equipment, the network entity comprises the master node or a secondary node in communication with the user equipment via use of multi-radio dual connectivity, and the instruction is received via a SCG associated with the secondary node.

In one aspect, the instruction is received from the network entity via: a RRC layer, a PDCP layer, a RLC layer, a MAC layer, or L1 signaling.

In one aspect, method 1300 further includes performing radio link measurements for a primary cell of the one or more cells previously serving the user equipment subsequent to each of the one or more steps.

In one aspect, method 1300 further includes determining the primary cell is recovered based on the radio link measurements.

In one aspect, method 1300 further includes, based on determining the primary cell is recovered, performing an uplink transmission with the one or more cells.

In one aspect, the uplink transmission is transmitted via a physical random access channel, a physical uplink shared channel, or a physical uplink control channel.

In one aspect, method 1300 further includes receiving from a network entity, a handover command or a message indicating to resume uplink transmission via the radio link of the one or more cells.

In one aspect, method 1300 further includes, based on receiving the handover command or the message, performing the uplink transmission.

In one aspect, the one or more cells belong to an MCG associated with a master node previously in communication with the user equipment.

In one aspect, method 1300 further includes detecting a SCG radio link failure.

In one aspect, method 1300 further includes, based on detecting the SCG radio link failure, terminating performance of the one or more steps of the radio link monitoring, failure detection, or recovery process.

In one aspect, method 1300 further includes communicating with the master node and a secondary node using multi-radio dual connectivity.

In one aspect, at least one of the of the MCG associated with the master node or an SCG associated with the secondary node is within a terrestrial network, and the other of the MCG associated with the master node or the SCG associated with the secondary node is associated with the terrestrial network or a non-terrestrial network.

Figure 15:
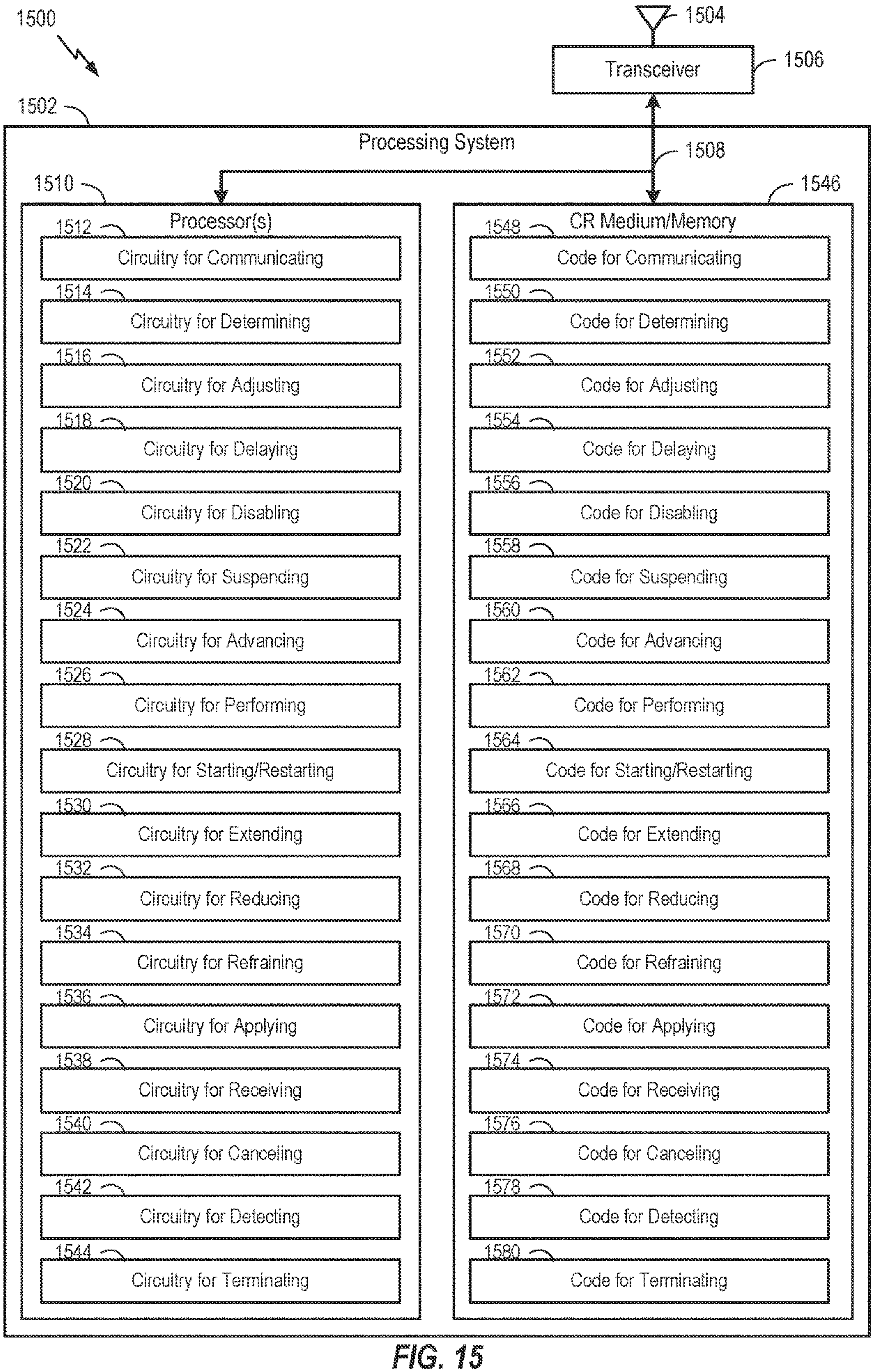
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Operations by a Network Entity

Figure 14:
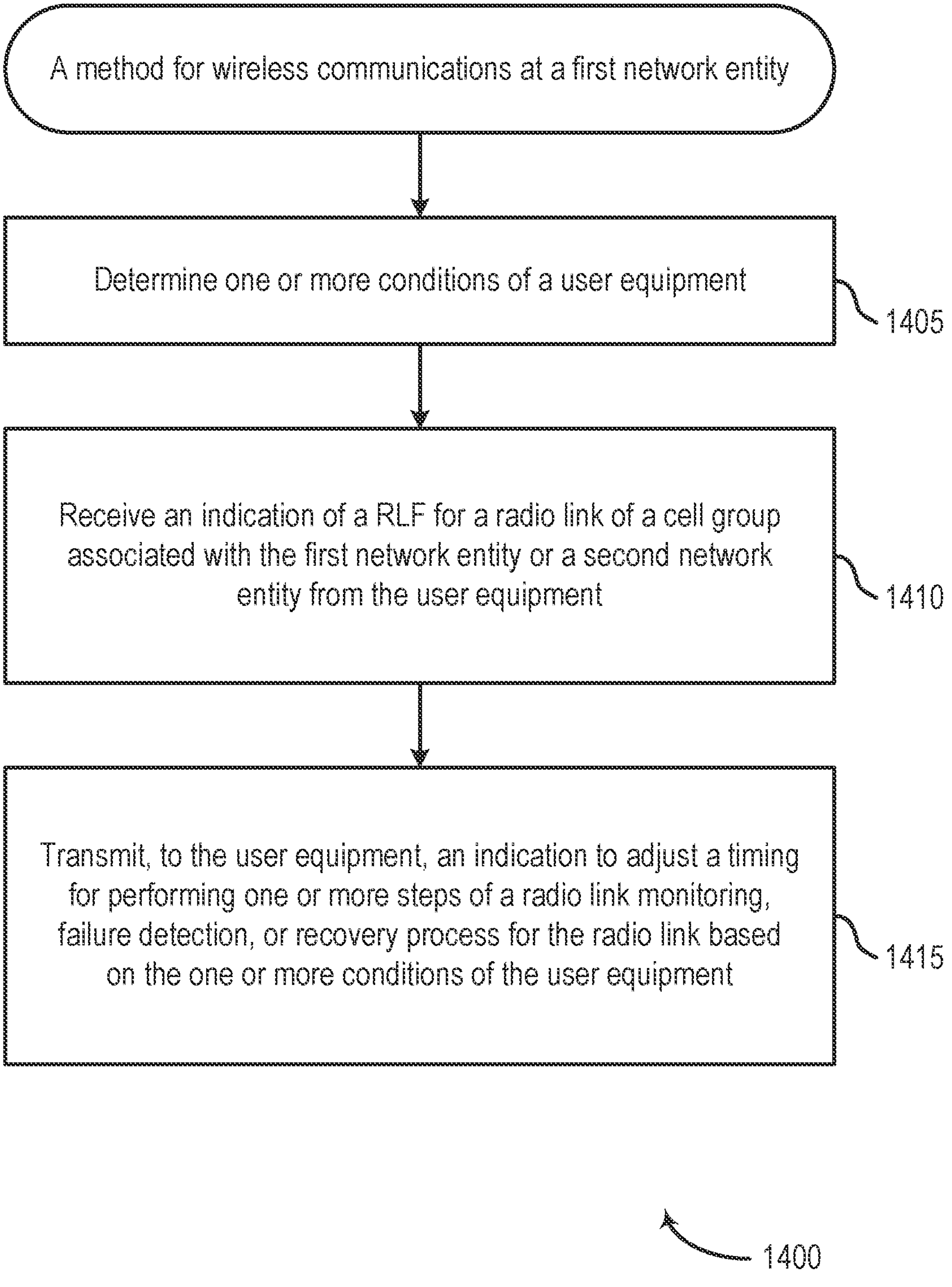
FIG. 14 depicts another method for wireless communications.

FIG. 14 shows a method 1400 for wireless communications at a first network entity, such as BS 102 of FIGS. 1 and 3, or a disaggregated base station as discussed with respect to FIG. 2.

Method 1400 begins at step 1405 with determining one or more conditions of a user equipment.

Method 1400 then proceeds to step 1410 with receiving an indication of a RLF for a radio link of a cell group associated with the first network entity or a second network entity from the user equipment.

Method 1400 then proceeds to step 1415 with transmitting, to the user equipment, an indication to adjust a timing for performing one or more steps of a radio link monitoring, failure detection, or recovery process for the radio link based on the one or more conditions of the user equipment.

In one aspect, the first network entity comprises a master node, the second network entity comprises a secondary node, and the cell group is a MCG associated with the first network entity.

In one aspect, the indication of the RLF is received from the secondary node.

In one aspect, the indication to adjust the timing for performing the one or more steps of the radio link monitoring, failure detection, or recovery process is transmitted to the user equipment via a SCG associated with the secondary node.

In one aspect, the first network entity comprises a secondary node, the second network entity comprises a master node, and the cell group is an SCG associated with the first network entity.

In one aspect, the indication of the RLF is received from the user equipment.

In one aspect, method 1400 further includes forwarding the indication to the second network entity.

In one aspect, the one or more conditions include: a location of the user equipment, a time, a velocity of the user equipment, a searching period of a serving cell of the user equipment, a searching time of the serving cell of the user equipment, a frequency of the serving cell of the user equipment, a radio access technology of the serving cell of the user equipment, a network type of the serving cell of the user equipment, wherein the network type comprises a terrestrial network or a non-terrestrial network, an orbit of the serving cell of the user equipment, or a capability of the user equipment.

In one aspect, the serving cell of the user equipment comprises a primary cell.

In one aspect, method 1400 further includes configuring the user equipment with the one or more conditions.

In one aspect, the one or more conditions for the user equipment were configured by the second network entity.

In one aspect, the indication to adjust the timing for performing the one or more steps of the radio link monitoring, failure detection, or recovery process comprises an indication to delay the timing for performing each of the one or more steps.

In one aspect, the indication to adjust the timing for performing the one or more steps of the radio link monitoring, failure detection, or recovery process comprises an indication to advance the timing for performing each of the one or more steps.

In one aspect, the indication to adjust the timing for performing the one or more steps of the radio link monitoring, failure detection, or recovery process comprises an indication to suspend the timing for performing each of the one or more steps.

In one aspect, the indication to adjust the timing for performing the one or more steps of the radio link monitoring, failure detection, or recovery process comprises an indication to disable the timing for performing each of the one or more steps.

In one aspect, the indication to adjust the timing for performing the one or more steps of the radio link monitoring, failure detection, or recovery process comprises an indication to cancel performing each of the one or more steps.

In one aspect, the indication to adjust the timing for performing the one or more steps of the radio link monitoring, failure detection, or recovery process is transmitted, to the user equipment, via: a RRC layer, a PDCP layer, a RLC layer, a MAC layer, or L1 signaling.

In one aspect, the cell group comprises an MCG associated with the first network entity or the second network entity, at least one of the MCG associated with the first network entity or the second network entity or an SCG associated with the other of the first network entity or the second network entity is within a terrestrial network, and the other of the MCG associated with the first network entity or the second network entity or the SCG associated with the first network entity or the second network entity is associated with the terrestrial network or a non-terrestrial network.

In one aspect, method 1400 further includes configuring the user equipment to adjust the timing for performing the one or more steps of the radio link monitoring, failure detection, or recovery process for the radio link based on the one or more conditions of the user equipment.

Figure 16:
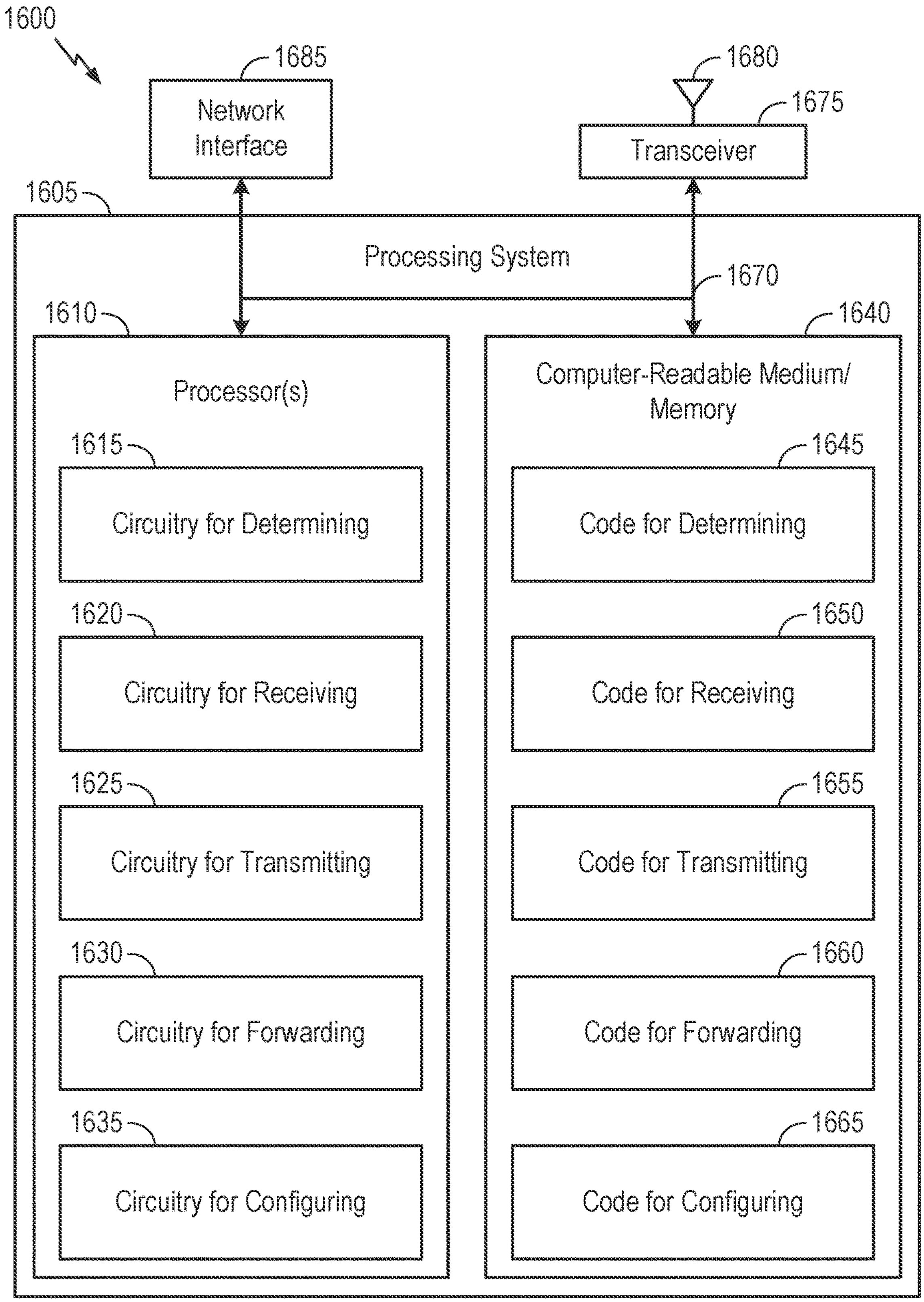
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment, such as UE 104 described above with respect to FIGS. 1 and 3.

The communications device 1500 includes a processing system 1502 coupled to a transceiver 1506 (e.g., a transmitter and/or a receiver). The transceiver 1506 is configured to transmit and receive signals for the communications device 1500 via an antenna 1504, such as the various signals as described herein. The processing system 1502 may be configured to perform processing functions for the communications device 1500, including processing signals received and/or to be transmitted by the communications device 1500.

The processing system 1502 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1546 via a bus 1508. In certain aspects, the computer-readable medium/memory 1546 is configured to store instructions (e.g., computer-executable code) that when executed by the one or more processors 1510, enable and cause the one or more processors 1510 to perform the method 1300 described with respect to FIG. 13, or any aspect related to it, including any additional steps or sub-steps described in relation to FIG. 13. Note that reference to a processor performing a function of communications device 1500 may include one or more processors performing that function of communications device 1500, such as in a distributed fashion.

In the depicted example, computer-readable medium/memory 1546 stores code for communicating 1548, code for determining 1550, code for adjusting 1552, code for delaying 1554, code for disabling 1556, code for suspending 1558, code for advancing 1560, code for performing 1562, code for starting/restarting 1564, code for extending 1566, code for reducing 1568, code for refraining 1570, code for applying 1572, code for receiving 1574, code for canceling 1576, code for detecting 1578, and code for terminating 1580. Processing of the code 1548-1580 may enable and cause the communications device 1500 to perform the method 1300 described with respect to FIG. 13, or any aspect related to it.

The one or more processors 1510 include circuitry configured to implement (e.g., execute) the code stored in the computer-readable medium/memory 1546, including circuitry for communicating 1512, circuitry for determining 1514, circuitry for adjusting 1516, circuitry for delaying 1518, circuitry for disabling 1520, circuitry for suspending 1522, circuitry for advancing 1524, circuitry for performing 1526, circuitry for starting/restarting 1528, circuitry for extending 1530, circuitry for reducing 1532, circuitry for refraining 1534, circuitry for applying 1536, circuitry for receiving 1538, circuitry for canceling 1540, circuitry for detecting 1542, and circuitry for terminating 1544. Processing with circuitry 1512-1544 may enable and cause the communications device 1500 to perform the method 1300 described with respect to FIG. 13, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1506 and/or antenna 1504 of the communications device 1500 in FIG. 15, and/or one or more processors 1510 of the communications device 1500 in FIG. 15. Means for communicating, receiving or obtaining may include the transceivers 354, antenna(s) 352, receive processor 358, and/or controller/processor 380 of the UE 104 illustrated in FIG. 3, transceiver 1506 and/or antenna 1504 of the communications device 1500 in FIG. 15, and/or one or more processors 1510 of the communications device 1500 in FIG. 15.

FIG. 16 depicts aspects of an example communications device 1600. In some aspects, communications device 1600 is a network entity, such as BS 102 of FIGS. 1 and 3, a disaggregated base station as discussed with respect to FIG. 2, a master node 1004, 1104, 1204 of FIGS. 10, 11, and 12, respectively, or a secondary node 1006, 1106, 1206 of FIGS. 10, 11, and 12, respectively.

The communications device 1600 includes a processing system 1605 coupled to a transceiver 1675 (e.g., a transmitter and/or a receiver) and/or a network interface 1685. The transceiver 1675 is configured to transmit and receive signals for the communications device 1600 via an antenna 1680, such as the various signals as described herein. The network interface 1685 is configured to obtain and send signals for the communications device 1600 via communications link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1640 via a bus 1670. In certain aspects, the computer-readable medium/memory 1640 is configured to store instructions (e.g., computer-executable code) that when executed by the one or more processors 1610, enable and cause the one or more processors 1610 to perform the method 1400 described with respect to FIG. 14, or any aspect related to it, including any additional steps or sub-steps described in relation to FIG. 14. Note that reference to a processor of communications device 1600 performing a function may include one or more processors of communications device 1600 performing that function, such as in a distributed fashion.

In the depicted example, the computer-readable medium/memory 1640 stores code for determining 1645, code for receiving 1650, code for transmitting 1655, code for forwarding 1660, and code for configuring 1665. Processing of the code 1645-1665 may enable and cause the communications device 1600 to perform the method 1400 described with respect to FIG. 14, or any aspect related to it.

The one or more processors 1610 include circuitry configured to implement (e.g., execute) the code stored in the computer-readable medium/memory 1640, including circuitry for determining 1615, circuitry for receiving 1620, circuitry for transmitting 1625, circuitry for forwarding 1630, and circuitry for configuring 1635. Processing with circuitry 1615-1635 may enable and cause the communications device 1600 to perform the method 1400 described with respect to FIG. 14, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1675 and/or antenna 1680 of the communications device 1600 in FIG. 16, and/or one or more processors 1610 of the communications device 1600 in FIG. 16. Means for communicating, receiving or obtaining may include the transceivers 332, antenna(s) 334, receive processor 338, and/or controller/processor 340 of the BS 102 illustrated in FIG. 3, transceiver 1675 and/or antenna 1680 of the communications device 1600 in FIG. 16, and/or one or more processors 1610 of the communications device 1600 in FIG. 16.

EXAMPLE CLAUSES

Implementation examples are described in the following numbered clauses:

Clause 1: A method for wireless communications at a user equipment, comprising: determining one or more conditions of the user equipment; and based on the one or more conditions of the user equipment, adjusting a timing for performing one or more steps of a radio link monitoring, failure detection, or recovery process for a radio link of one or more cells.

Clause 2: The method of Clause 1, wherein the one or more conditions include: a location of the user equipment, a time, a velocity of the user equipment, a searching period of a serving cell of the user equipment, a searching time of the serving cell of the user equipment, a frequency of the serving cell of the user equipment, a radio access technology of the serving cell of the user equipment, a network type of the serving cell of the user equipment, wherein the network type comprises a terrestrial network or a non-terrestrial network, an orbit of the serving cell of the user equipment, or a capability of the user equipment.

Clause 3: The method of Clause 2, wherein the serving cell of the user equipment comprises a primary cell.

Clause 4: The method of any one of Clauses 1-3, wherein the one or more conditions were configured by a network entity.

Clause 5: The method of any one of Clauses 1-4, wherein to adjust the timing for performing each of the one or more steps, the method comprises delaying the timing.

Clause 6: The method of Clause 5, wherein to delay the timing for a step, the method comprises: starting a timer after one or more conditions for performing the step are met; and performing the step at an expiration of the timer.

Clause 7: The method of Clause 5, wherein: a timing of performing a step of the one or more steps is based on a timer; and to delay the timing of performing the step, the method comprises: restarting the timer prior to an expiration of the timer; and performing the step after the expiration of the timer.

Clause 8: The method of Clause 5, wherein: a timing of performing a step of the one or more steps is based on a timer; and to delay the timing of performing the step, the method comprises: extending a time value configured for the timer; and performing the step after the timer expires, wherein an expiration of the timer occurs after an amount of time equal to the extended time value configured for the timer has passed.

Clause 9: The method of Clause 5, wherein: a timing of performing a step of the one or more steps is based on a timer; and to delay the timing of performing the step, the method comprises: applying a scaling factor to a time value configured for the timer, wherein the scaling factor is greater than one; and performing the step after the timer expires, wherein an expiration of the timer occurs after an amount of time equal to the time value configured for the timer with the scaling factor applied has passed.

Clause 10: The method of any one of Clauses 1-9, wherein to adjust the timing for performing each of the one or more steps, the method comprises canceling the one or more steps.

Clause 11: The method of Clause 10, wherein to disable the timing for a step, the method comprises starting a timer and performing the step after the timer expires, wherein the timer is set up to never expire or a specific value.

Clause 12: The method of any one of Clauses 1-11, wherein to adjust the timing for performing each of the one or more steps, the method comprises disabling the one or more steps.

Clause 13: The method of any one of Clauses 1-12, wherein to adjust the timing for performing each of the one or more steps, the method comprises suspending the one or more steps.

Clause 14: The method of Clause 13, wherein to suspend the timing for a step, the method comprises refraining from performing the step until an indication to resume the step is received from a network entity.

Clause 15: The method of any one of Clauses 1-14, wherein to adjust the timing for performing each of the one or more steps, the method comprises advancing the timing.

Clause 16: The method of Clause 15, wherein: a timing of performing a step of the one or more steps is based on a timer; and to advance the timing of performing the step, the method comprises: terminating a timer prior to an expiration of the timer; and performing the step based on the termination.

Clause 17: The method of Clause 15, wherein: a timing of performing a step of the one or more steps is based on a timer; and to advance the timing for the step, the method comprises: reducing a time value configured for the timer; and performing the step at an expiration of the timer, wherein the expiration of the timer occurs after an amount of time equal to the reduced time value configured for the timer has passed.

Clause 18: The method of Clause 15, wherein: a timing of performing a step of the one or more steps is based on a timer; and to advance the timing of performing the step, the method comprises: applying a scaling factor to a time value configured for the timer, wherein the scaling factor is less than one; and performing the step after the timer expires, wherein an expiration of the timer occurs after an amount of time equal to the time value configured for the timer with the scaling factor applied has passed.

Clause 19: The method of any one of Clauses 1-18, wherein at least one of the one or more steps of the radio link monitoring, failure detection, or recovery process adjusted by the user equipment includes at least one of: a monitoring time for monitoring the radio link, a detection time for a failure of the radio link, an initiation time for a timer used to initiate a RRC re-establishment procedure, an expiration time for the timer used to initiate the RRC re-establishment procedure, a sending time for a failure message, or an initiate time for the RRC re-establishment procedure.

Clause 20: The method of any one of Clauses 1-19, further comprising receiving, from a network entity, instruction to adjust at least one of the one or more steps, wherein adjusting the timing for performing the one or more steps is further based on the instruction received from the network entity.

Clause 21: The method of Clause 20, wherein: the one or more cells belong to a MCG associated with a master node previously in communication with the user equipment, the network entity comprises the master node or a secondary node in communication with the user equipment via use of multi-radio dual connectivity, and the instruction is received via a SCG associated with the secondary node.

Clause 22: The method of Clause 20, wherein the instruction is received from the network entity via: a RRC layer, a PDCP layer, a RLC layer, a MAC layer, or L1 signaling.

Clause 23: The method of any one of Clauses 1-22, further comprising: performing radio link measurements for a primary cell of the one or more cells previously serving the user equipment subsequent to each of the one or more steps; determining the primary cell is recovered based on the radio link measurements; and based on determining the primary cell is recovered, performing an uplink transmission with the one or more cells.

Clause 24: The method of Clause 23, wherein the uplink transmission is transmitted via a physical random access channel, a physical uplink shared channel, or a physical uplink control channel.

Clause 25: The method of any one of Clauses 1-24, further comprising: receiving from a network entity, a handover command or a message indicating to resume uplink transmission via the radio link of the one or more cells; and based on receiving the handover command or the message, performing the uplink transmission.

Clause 26: The method of any one of Clauses 1-25, wherein the one or more cells belong to an MCG associated with a master node previously in communication with the user equipment.

Clause 27: The method of Clause 26, further comprising: detecting a SCG radio link failure; and based on detecting the SCG radio link failure, terminating performance of the one or more steps of the radio link monitoring, failure detection, or recovery process.

Clause 28: The method of Clause 26, further comprising communicating with the master node and a secondary node using multi-radio dual connectivity.

Clause 29: The method of Clause 28, wherein: at least one of the of the MCG associated with the master node or an SCG associated with the secondary node is within a terrestrial network, and the other of the MCG associated with the master node or the SCG associated with the secondary node is associated with the terrestrial network or a non-terrestrial network.

Clause 30: A method for wireless communications at a first network entity, comprising: determining one or more conditions of a user equipment; receiving an indication of a RLF for a radio link of a cell group associated with the first network entity or a second network entity from the user equipment; and transmitting, to the user equipment, an indication to adjust a timing for performing one or more steps of a radio link monitoring, failure detection, or recovery process for the radio link based on the one or more conditions of the user equipment.

Clause 31: The method of Clause 30, wherein: the first network entity comprises a master node, the second network entity comprises a secondary node, and the cell group is a MCG associated with the first network entity.

Clause 32: The method of Clause 31, wherein the indication of the RLF is received from the secondary node.

Clause 33: The method of Clause 31, wherein the indication to adjust the timing for performing the one or more steps of the radio link monitoring, failure detection, or recovery process is transmitted to the user equipment via a SCG associated with the secondary node.

Clause 34: The method of any one of Clauses 30-33, wherein: the first network entity comprises a secondary node, the second network entity comprises a master node, and the cell group is an SCG associated with the first network entity.

Clause 35: The method of Clause 34, wherein the indication of the RLF is received from the user equipment.

Clause 36: The method of Clause 34, further comprising forwarding the indication to the second network entity.

Clause 37: The method of any one of Clauses 30-36, wherein the one or more conditions include: a location of the user equipment, a time, a velocity of the user equipment, a searching period of a serving cell of the user equipment, a searching time of the serving cell of the user equipment, a frequency of the serving cell of the user equipment, a radio access technology of the serving cell of the user equipment, a network type of the serving cell of the user equipment, wherein the network type comprises a terrestrial network or a non-terrestrial network, an orbit of the serving cell of the user equipment, or a capability of the user equipment.

Clause 38: The method of Clause 37, wherein the serving cell of the user equipment comprises a primary cell.

Clause 39: The method of any one of Clauses 30-38, further comprising configuring the user equipment with the one or more conditions.

Clause 40: The method of any one of Clauses 30-39, wherein the one or more conditions for the user equipment were configured by the second network entity.

Clause 41: The method of any one of Clauses 30-40, wherein the indication to adjust the timing for performing the one or more steps of the radio link monitoring, failure detection, or recovery process comprises an indication to delay the timing for performing each of the one or more steps.

Clause 42: The method of any one of Clauses 30-41, wherein the indication to adjust the timing for performing the one or more steps of the radio link monitoring, failure detection, or recovery process comprises an indication to advance the timing for performing each of the one or more steps.

Clause 43: The method of any one of Clauses 30-42, wherein the indication to adjust the timing for performing the one or more steps of the radio link monitoring, failure detection, or recovery process comprises an indication to suspend the timing for performing each of the one or more steps.

Clause 44: The method of any one of Clauses 30-43, wherein the indication to adjust the timing for performing the one or more steps of the radio link monitoring, failure detection, or recovery process comprises an indication to disable the timing for performing each of the one or more steps.

Clause 45: The method of any one of Clauses 30-44, wherein the indication to adjust the timing for performing the one or more steps of the radio link monitoring, failure detection, or recovery process comprises an indication to cancel performing each of the one or more steps.

Clause 46: The method of any one of Clauses 30-45, wherein the indication to adjust the timing for performing the one or more steps of the radio link monitoring, failure detection, or recovery process is transmitted, to the user equipment, via: a RRC layer, a PDCP layer, a RLC layer, a MAC layer, or L1 signaling.

Clause 47: The method of any one of Clauses 30-46, wherein: the cell group comprises an MCG associated with the first network entity or the second network entity, at least one of the MCG associated with the first network entity or the second network entity or an SCG associated with the other of the first network entity or the second network entity is within a terrestrial network, and the other of the MCG associated with the first network entity or the second network entity or the SCG associated with the first network entity or the second network entity is associated with the terrestrial network or a non-terrestrial network.

Clause 48: The method of any one of Clauses 30-47, further comprising configuring the user equipment to adjust the timing for performing the one or more steps of the radio link monitoring, failure detection, or recovery process for the radio link based on the one or more conditions of the user equipment.

Clause 49: One or more apparatuses, comprising: one or more memories comprising executable instructions; and one or more processors configured to execute the executable instructions and cause the one or more apparatuses to perform a method in accordance with any one of Clauses 1-48.

Clause 50: One or more apparatuses, comprising means for performing a method in accordance with any one of Clauses 1-48.

Clause 51: One or more non-transitory computer-readable media comprising executable instructions that, when executed by one or more processors of one or more apparatuses, cause the one or more apparatuses to perform a method in accordance with any one of Clauses 1-48.

Clause 52: One or more computer program products embodied on one or more computer-readable storage media comprising code for performing a method in accordance with any one of Clauses 1-48.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." For example, reference to "a processor," "a controller," "a memory," etc., unless otherwise specifically stated, should be understood to refer to "one or more processors," "one or more controllers," "one or more memories," etc. Further, where reference is made in a claim to one or more elements performing functions, it should be understood, unless otherwise specifically stated, that each function need not be performed by each of the one or more elements, but rather the functions may be performed by the one or more elements in a distributed fashion. For example, in a claim with a first processor and a second processor configured to perform a first function and a second function, the first function may be performed by the first processor, the second processor, or both the first processor and the second processor, and the second function may be performed by first processor, the second processor, or both the first processor and the second processor. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A user equipment configured for wireless communications, comprising: memory; and one or more processors coupled to the memory and configured to cause the user equipment to:

determine one or more conditions of the user equipment; and based on the one or more conditions of the user equipment, adjust a timing for performing one or more steps of a radio link monitoring, failure detection, or recovery process for a radio link of one or more cells, wherein to adjust the timing for performing each of the one or more steps, the one or more processors are configured to cause the user equipment to:

cancel the one or more steps; or disable the one or more steps; or suspend the one or more steps.

2. The user equipment of claim 1, wherein the one or more conditions include:

a location of the user equipment, a time, a velocity of the user equipment, a searching period of a serving cell of the user equipment, a searching time of the serving cell of the user equipment, a frequency of the serving cell of the user equipment, a radio access technology of the serving cell of the user equipment, a network type of the serving cell of the user equipment, wherein the network type comprises a terrestrial network or a non-terrestrial network, an orbit of the serving cell of the user equipment, or
a capability of the user equipment.

3. The user equipment of claim 1, wherein the one or more conditions were configured by a network entity.

4. The user equipment of claim 1, wherein to adjust the timing for performing each of the one or more steps, the one or more processors are configured to cause the user equipment to cancel the one or more steps.

5. The user equipment of claim 4, wherein to adjust the timing for a step, the one or more processors are configured to cause the user equipment to start a timer and to perform the step after the timer expires, wherein the timer is set up to never expire or a specific value.

6. The user equipment of claim 1, wherein to adjust the timing for performing each of the one or more steps, the one or more processors are configured to cause the user equipment to disable the one or more steps.

7. The user equipment of claim 1, wherein to adjust the timing for performing each of the one or more steps, the one or more processors are configured to cause the user equipment to suspend the one or more steps.

8. The user equipment of claim 7, wherein to suspend the timing for a step, the one or more processors are configured to cause the user equipment to refrain from performing the step until an indication to resume the step is received from a network entity.

9. The user equipment of claim 1, wherein at least one of the one or more steps of the radio link monitoring, failure detection, or recovery process adjusted by the user equipment includes at least one of:
a monitoring time for monitoring the radio link,
a detection time for a failure of the radio link,
an initiation time for a timer used to initiate a radio resource control (RRC) re-establishment procedure,
an expiration time for the timer used to initiate the RRC re-establishment procedure,
a sending time for a failure message, or
an initiate time for the RRC re-establishment procedure.

10. The user equipment of claim 1, wherein the one or more processors are configured to cause the user equipment to receive, from a network entity, instruction to adjust at least one of the one or more steps, wherein to adjust the timing for performing the one or more steps is further based on the instruction received from the network entity.

11. The user equipment of claim 1, wherein the one or more processors are configured to cause the user equipment to:
perform radio link measurements for a primary cell of the one or more cells previously serving the user equipment subsequent to each of the one or more steps;
determine the primary cell is recovered based on the radio link measurements; and
based on determining the primary cell is recovered, perform an uplink transmission with the one or more cells.

12. The user equipment of claim 1, wherein the one or more processors are configured to cause the user equipment to:
receive, from a network entity, a handover command or a message indicating to resume uplink transmission via the radio link of the one or more cells; and
based on receiving the handover command or the message, perform the uplink transmission.

13. The user equipment of claim 1, wherein:
the one or more cells belong to an MCG associated with a master node previously in communication with the user equipment, and
the one or more processors are configured to cause the user equipment to:
detect a secondary cell group (SCG) radio link failure; and
based on detecting the SCG radio link failure, terminate performance of the one or more steps of the radio link monitoring, failure detection, or recovery process.

14. The user equipment of claim 1, wherein:
the one or more processors are configured to cause the user equipment to communicate a master node and a secondary node using multi-radio dual connectivity,
the one or more cells belong to an MCG associated with the master node previously in communication with the user equipment,
at least one of the MCG associated with the master node or an SCG associated with the secondary node is within a terrestrial network, and
the other of the MCG associated with the master node or the SCG associated with the secondary node is associated with the terrestrial network or a non-terrestrial network.

15. A method for wireless communications by an apparatus comprising:
determining one or more conditions of the apparatus; and
based on the one or more conditions of the apparatus, adjusting a timing for performing one or more steps of a radio link monitoring, failure detection, or recovery process for a radio link of one or more cells,
wherein adjusting the timing for performing each of the one or more steps comprises:
canceling the one or more steps; or
disabling the one or more steps; or
suspending the one or more steps.

16. The method of claim 15, wherein the one or more conditions include:
a location of the user equipment,
a time,
a velocity of the user equipment,
a searching period of a serving cell of the user equipment,
a searching time of the serving cell of the user equipment,
a frequency of the serving cell of the user equipment,
a radio access technology of the serving cell of the user equipment,
a network type of the serving cell of the user equipment, wherein the network type comprises a terrestrial network or a non-terrestrial network,
an orbit of the serving cell of the user equipment, or
a capability of the user equipment.

17. The method of claim 15, wherein the one or more conditions were configured by a network entity.

18. The method of claim 15, wherein adjusting the timing for performing each of the one or more steps comprises canceling the one or more steps.

19. The method of claim 18, wherein adjusting the timing for a step comprises starting a timer and performing the step after the timer expires, wherein the timer is set up to never expire or a specific value.

20. The method of claim 15, wherein adjusting the timing for performing each of the one or more steps comprises disabling the one or more steps.

21. The method of claim 15, wherein adjusting the timing for performing each of the one or more steps comprises suspending the one or more steps.

22. The method of claim 21, wherein suspending the timing for a step comprises refraining from performing the step until an indication to resume the step is received from a network entity.

23. The method of claim 15, wherein at least one of the one or more steps of the radio link monitoring, failure detection, or recovery process adjusted by the user equipment includes at least one of:

a monitoring time for monitoring the radio link, a detection time for a failure of the radio link, an initiation time for a timer used to initiate a radio resource control (RRC) re-establishment procedure, an expiration time for the timer used to initiate the RRC re-establishment procedure, a sending time for a failure message, or an initiate time for the RRC re-establishment procedure.

24. The method of claim 15, wherein the method comprises receiving, from a network entity, instruction to adjust at least one of the one or more steps, wherein adjusting the timing for performing the one or more steps is further based on the instruction received from the network entity.

25. The method of claim 15, wherein the method comprises:

performing radio link measurements for a primary cell of the one or more cells previously serving the user equipment subsequent to each of the one or more steps;

determining the primary cell is recovered based on the radio link measurements; and based on determining the primary cell is recovered, performing an uplink transmission with the one or more cells.

26. The method of claim 15, wherein the method comprises:

receiving, from a network entity, a handover command or a message indicating to resume uplink transmission via the radio link of the one or more cells; and based on receiving the handover command or the message, performing the uplink transmission.

27. The method of claim 15, wherein:

the one or more cells belong to an MCG associated with a master node previously in communication with the user equipment, and the method comprises:

detecting a secondary cell group (SCG) radio link failure; and based on detecting the SCG radio link failure, terminating performance of the one or more steps of the radio link monitoring, failure detection, or recovery process.

28. The method of claim 15, wherein:

the method comprises communicating a master node and a secondary node using multi-radio dual connectivity, the one or more cells belong to an MCG associated with the master node previously in communication with the user equipment, at least one of the MCG associated with the master node or an SCG associated with the secondary node is within a terrestrial network, and the other of the MCG associated with the master node or the SCG associated with the secondary node is associated with the terrestrial network or a non-terrestrial network.

29. A user equipment configured for wireless communications, comprising: memory; and one or more processors coupled to the memory and configured to cause the user equipment to:

determine one or more conditions of the user equipment; and based on the one or more conditions of the user equipment, adjust a timing for performing one or more steps of a radio link monitoring, failure detection, or recovery process for a radio link of one or more cells, wherein: a timing of performing a step of the one or more steps is based on a timer, and wherein to adjust the timing for performing each of the one or more steps, the one or more processors are configured to cause the user equipment to advance the timing, and to advance the timing of performing the step, the one or more processors are configured to cause the user equipment to:

terminate a timer prior to an expiration of the timer; and perform the step based on the termination.

30. A method for wireless communications by an apparatus comprising:

determining one or more conditions of the apparatus; and based on the one or more conditions of the apparatus, adjust a timing for performing one or more steps of a radio link monitoring, failure detection, or recovery process for a radio link of one or more cells, wherein a timing of performing a step of the one or more steps is based on a timer, and wherein adjusting the timing for performing each of the one or more steps comprises advancing the timing, and advancing the timing of performing the step comprises:

terminating a timer prior to an expiration of the timer; and performing the step based on the termination.

* * * * *